United States Patent
Kim et al.

(10) Patent No.: US 9,813,993 B1
(45) Date of Patent: Nov. 7, 2017

(54) MOBILE TERMINAL AND CONTROLLING METHOD THEREOF

(71) Applicant: LG ELECTRONICS INC., Seoul (KR)

(72) Inventors: Namki Kim, Seoul (KR); Shinnyue Kang, Seoul (KR); Bongjeong Jeon, Seoul (KR); Yoonseok Yang, Seoul (KR); Insuk Kim, Seoul (KR); Sesook Oh, Seoul (KR); Kyunghye Seo, Seoul (KR); Jian Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/266,935

(22) Filed: Sep. 15, 2016

(30) Foreign Application Priority Data

Jun. 23, 2016 (KR) .......................... 10-2016-0078569

(51) Int. Cl.
| | | |
|---|---|---|
| H04B 1/38 | (2015.01) | |
| H04W 52/02 | (2009.01) | |
| H04B 1/3883 | (2015.01) | |
| H04M 1/00 | (2006.01) | |

(52) U.S. Cl.
CPC ...... H04W 52/0296 (2013.01); H04B 1/3883 (2013.01)

(58) Field of Classification Search
CPC ......... H04W 52/0296; H04W 52/0261; H04W 52/0267; H04W 52/0277
USPC .............................................. 455/572, 343.6
See application file for complete search history.

(56) References Cited

U.S. PATENT DOCUMENTS

| | | | |
|---|---|---|---|
| 2001/0017532 A1 | 8/2001 | Han | |
| 2010/0124896 A1* | 5/2010 | Kumar | H04B 1/1607 455/404.1 |
| 2012/0322431 A1 | 12/2012 | Kil et al. | |
| 2015/0065201 A1* | 3/2015 | Lee | H04W 52/0296 455/566 |

FOREIGN PATENT DOCUMENTS

EP 2469686 A1 6/2012

OTHER PUBLICATIONS

European Patent Office Application Serial No. 16201700.8, Search Report dated Jun. 13, 2017, 11 pages.

* cited by examiner

*Primary Examiner* — Lee Nguyen
(74) *Attorney, Agent, or Firm* — Lee, Hong, Degerman, Kang & Waimey PC

(57) ABSTRACT

Disclosed are a mobile terminal and controlling method thereof. The present invention includes a battery unit including a main battery and a backup battery, a sensing unit, a display unit, and a controller configured to sense a residual quantity of the backup battery if entering a battery swap mode in the course of running a content, wherein the battery swap mode comprises a state that the main battery is separated from the mobile terminal and wherein the controller is further configured to determine a content operating mode based on the sensed residual quantity of the backup battery.

20 Claims, 22 Drawing Sheets

MOBILE TERMINAL AND CONTROLLING METHOD THEREOF

Pursuant to 35 U.S.C. §119(a), this application claims the benefit of earlier filing date and right of priority to Korean Application No. 10-2016-0078569, filed on Jun. 23, 2016, the contents of which are hereby incorporated by reference herein in its entirety.

BACKGROUND OF THE INVENTION

Field of the Invention

The present invention relates to a mobile terminal and controlling method thereof, and more particularly, to a mobile terminal and controlling method thereof, suitable for determining an operating mode of a currently run content according to a residual quantity of a backup battery in case of entering a battery swap mode in the course of running the content.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Moreover, since a mobile terminal can be equipped with a separable or detachable battery, if a remaining battery level is low, a user detaches and changes the battery. In doing so, in order to change the battery of the mobile terminal, the user turns off a power of the mobile terminal and then separates the battery from a body of the mobile terminal.

Thus, in using a mobile terminal of the related art, it is inconvenient for a user to change a battery after ending a currently run content.

SUMMARY OF THE INVENTION

Accordingly, an object of the present invention is to address the above-noted and other problems.

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a content operating mode can be determined based on a residual quantity of a backup battery in case of entering a battery swap mode in the course of running a content.

Another object of the present invention is to provide a mobile terminal and controlling method thereof, by which a control signal for controlling a currently run content to be run in an external terminal in accordance with a determined content operating mode can be transmitted to the external terminal.

Further object of the present invention is to provide a mobile terminal and controlling method thereof, by which minimum information for operating a currently run content in accordance with a determined content operating mode is outputted.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a battery unit including a main battery and a backup battery, a sensing unit, a display unit, and a controller configured to sense a residual quantity of the backup battery if entering a battery swap mode in the course of running a content, wherein the battery swap mode comprises a state that the main battery is separated from the mobile terminal and wherein the controller is further configured to determine a content operating mode based on the sensed residual quantity of the backup battery.

According to one aspect of the present invention, the mobile terminal may further include a wireless communication unit configured to communicate with an external terminal, wherein if the determined content operating mode is a first content operating mode, the controller may transmit a first control signal for controlling the currently run content to be run in the external terminal to the external terminal and ends the running of the content.

According to one aspect of the present invention, if the battery swap mode is ended, the controller may re-run the ended content.

According to one aspect of the present invention, the controller may re-run the ended content by starting at a first timing and the first timing may include a timing of ending the running of the run content in response to the first control signal in the external terminal.

According to one aspect of the present invention, the external terminal may include a terminal currently running the same content as run in the mobile terminal currently.

According to one aspect of the present invention, the mobile terminal may further include a camera, wherein the controller may receive a signal corresponding to a recording standby mode of the external terminal from the external terminal in a state of shooting a video in a first view angle area including a first object through the camera, wherein the recording standby mode may include a state that a view angle of a camera provided to the external terminal enters the first view angle area including the first object, wherein the controller may transmit a second control signal for controlling the first object to be recorded by starting at a second timing to the external terminal, and wherein the second timing may include a shot end timing of the camera.

According to one aspect of the present invention, while a video shooting of the camera is ended, the controller may receive a recorded video data from the external terminal.

According to one aspect of the present invention, if the battery swap mode is ended, the controller may record the first object by starting at a third timing based on the received video data. And, the third timing may include a timing at which a time taken for the external terminal to record the first object from the second timing in response to the second control signal expires.

According to one aspect of the present invention, if the battery swap mode is ended, the controller may transmit a third control signal for controlling the video data recorded in the external terminal to be deleted to the external terminal.

According to one aspect of the present invention, the mobile terminal may further include a microphone, the controller may receive a signal corresponding to a recording standby mode of the external terminal from the external terminal in the course of recording an audio of a second object through the microphone, the recording standby mode may include a state that a microphone provided to the external terminal senses the audio of the second object, the controller may transmit a fourth control signal for controlling the audio of the second object to be recorded by starting at a fourth timing, and the fourth timing may include a recording end timing of the microphone.

According to one aspect of the present invention, while the audio recording of the microphone is ended, the controller may receive the recorded audio data from the external terminal.

According to one aspect of the present invention, if the battery swap mode is ended, the controller may record the audio of the second object by starting at a fifth timing based on the received audio data. And, the fifth timing may include a timing at which a time taken for the external terminal to record the audio of the second object from the fourth timing in response to the fourth control signal expires.

According to one aspect of the present invention, if the battery swap mode is ended, the controller may transmit a fifth control signal for controlling the audio data recorded in the external terminal to be deleted to the external terminal.

According to one aspect of the present invention, if the determined content operating mode is a second content operating mode, the controller may output a minimum information for operating the currently run content to the display unit.

According to one aspect of the present invention, if the determined content operating mode is a third content operating mode, the controller may maintain the running of the content.

According to one aspect of the present invention, a reference of the residual quantity of the backup battery for determining the content operating mode may be determined based on the currently run content.

According to one aspect of the present invention, if a residual quantity of at least one of the main battery and the backup battery becomes equal to or smaller than a preset value, the controller may control a popup window indicating an entry into the battery swap mode to be outputted to the display unit.

In another aspect of the present invention, as embodied and broadly described herein, a method of controlling a mobile terminal according to another embodiment of the present invention may include running a content, entering a battery swap mode, corresponding to a state that a main battery is separated from the mobile terminal, in the course of running the content, sensing a residual quantity of a backup battery, and determining a content operating mode based on the sensed residual quantity of the backup battery.

According to another aspect of the present invention, if the determined content operating mode is a first content operating mode, the method may further include transmitting a first control signal for controlling the currently run content to be run in an external terminal to the external terminal.

According to another aspect of the present invention, if the determined content operating mode is a second content operating mode, the method may further include outputting a minimum information for operating the currently run content to a display unit.

Accordingly, the present invention provides the following effects and/or features.

According to at least one of embodiments of the present invention, in case of entering a battery swap mode in the course of running a content, since a mobile terminal can determined a content operating mode based on a backup battery residual quantity, it is advantageous in the a battery can be changed without ending the content.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
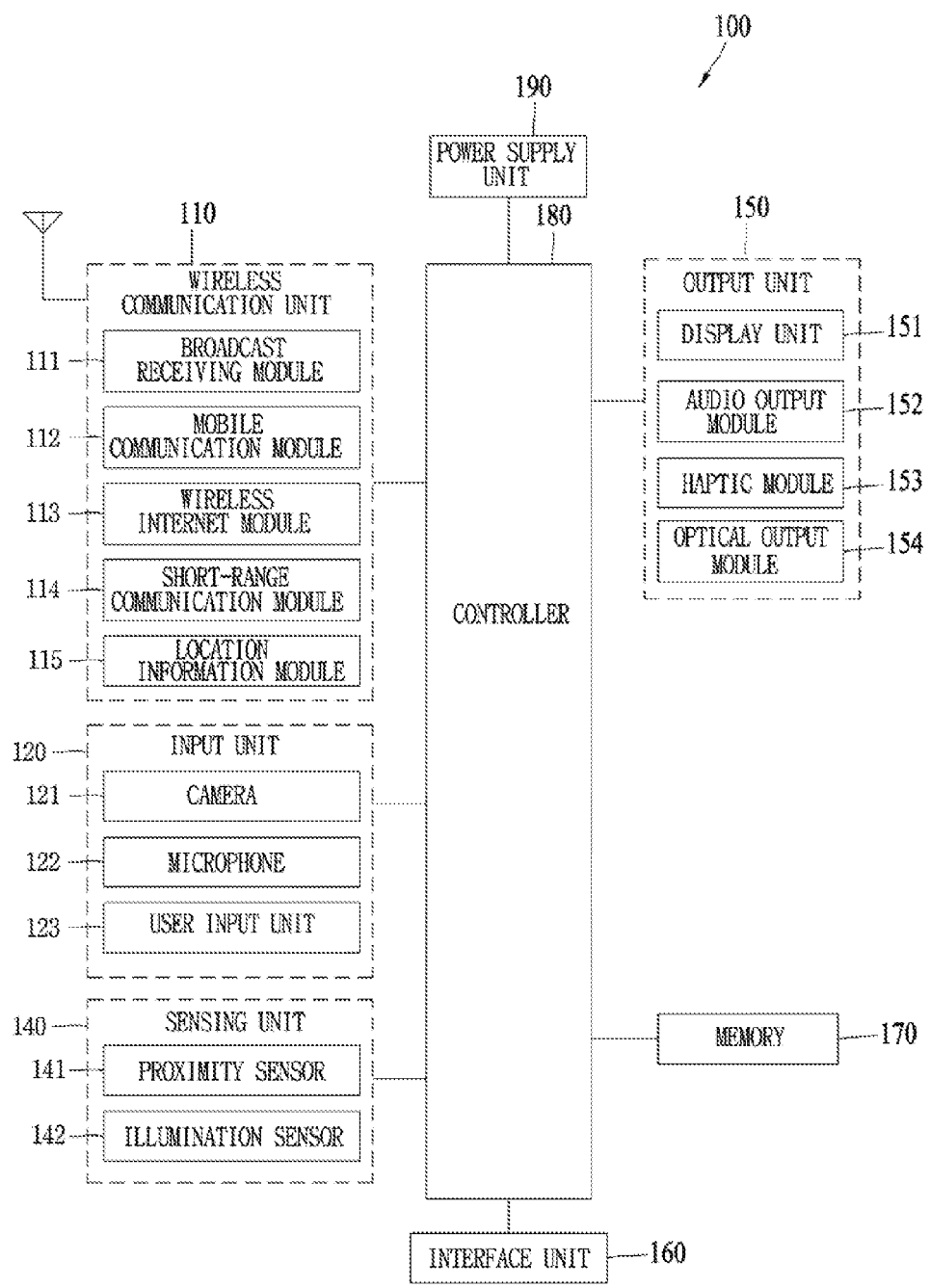
FIG. 1A is a block diagram of a mobile terminal in accordance with the present disclosure.
Figure 1B:
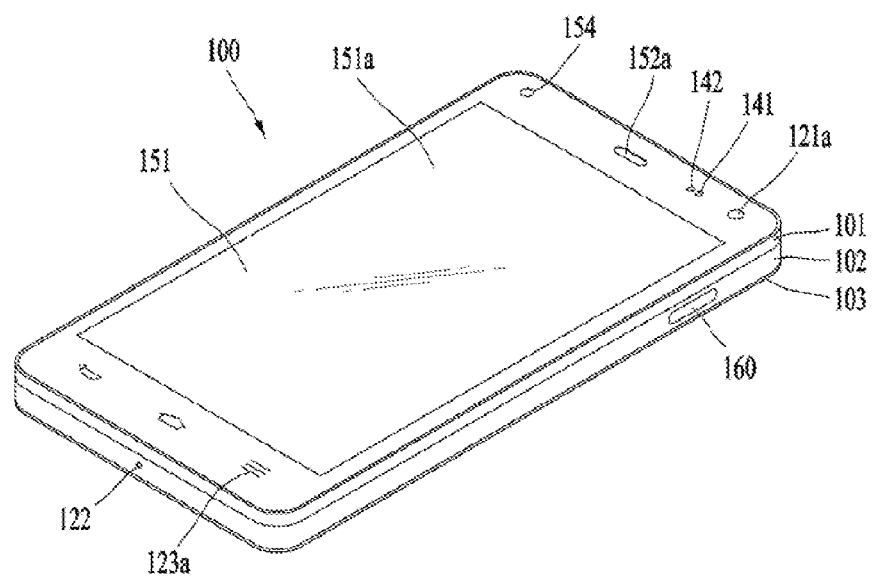
FIGS. 1B and 1C are conceptual views of one example of the mobile terminal, viewed from different directions.
Figure 1C:
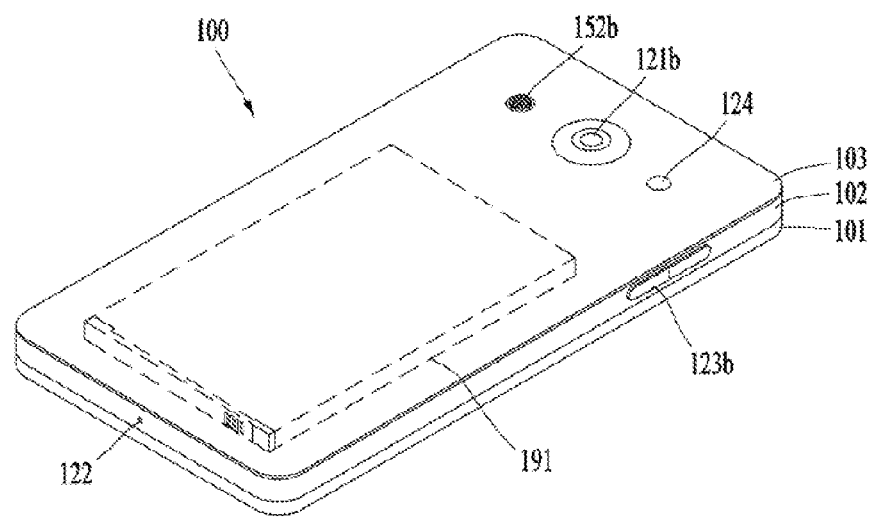

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
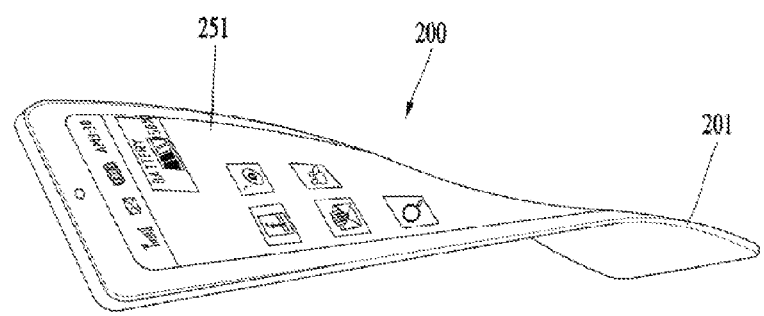
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
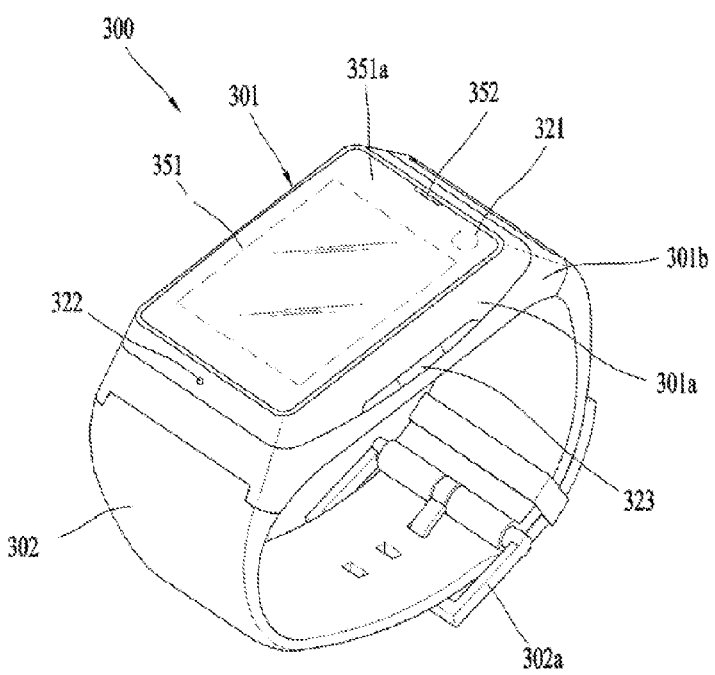
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301*a* and a second case 301*b* cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Figure 4:
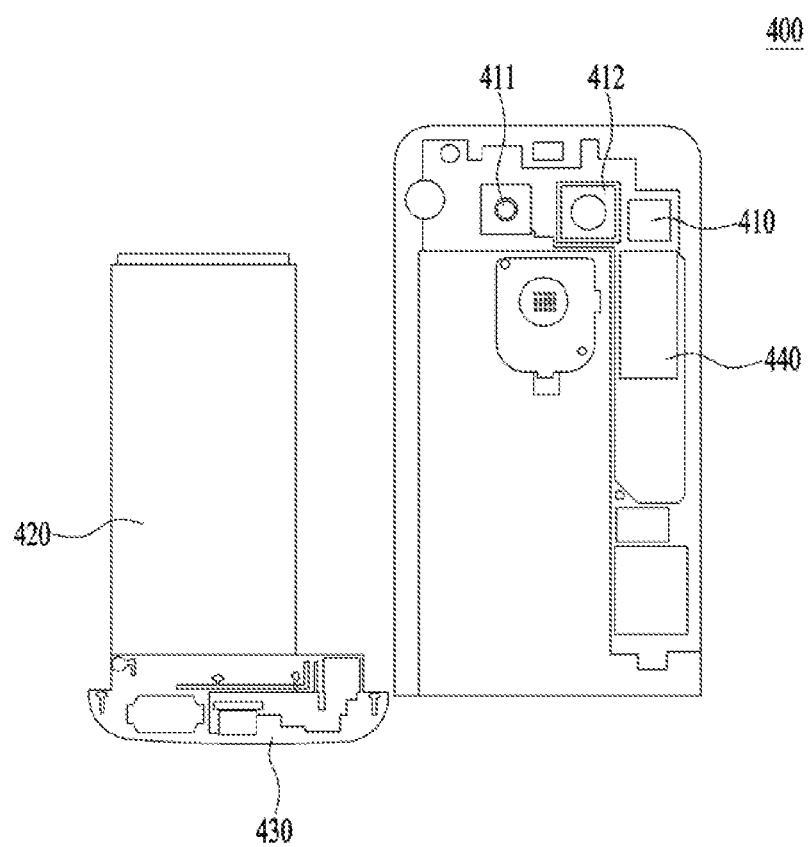
FIG. 4 is a perspective diagram of a mobile terminal including a main battery and a backup battery according to one embodiment of the present invention.

FIG. 4 is a perspective diagram of a mobile terminal including a main battery and a backup battery according to one embodiment of the present invention.

FIG. 4 is a perspective diagram to illustrate a rear side of a mobile terminal 400 from which a rear case is removed. Referring to FIG. 4, a mobile terminal 400 may include a main board 410, a main battery 420 and a replacement module 430.

The main board 410 may include a first camera 411, a second camera 412 and a backup battery 440.

In this case, the first and second cameras 411 and 412 may be embodied in the former cameras 121*a* and 121*b* shown in FIGS. 1A to 1C. Although FIG. 4 shows that two cameras are provided to a rear side of the mobile terminal 400 for example, at least one or more cameras can be provided to the mobile terminal 400.

The backup battery 440 may correspond to a battery built in the main board 410. The backup battery 440 is defaulted as built in the main board 410 but can be separated or detached by a user. The backup battery 440 is charged while built in the main board 410 and can be also charged in a manner of being separated from the main board 410 by a user. While the mobile terminal 400 is being charged, the backup battery 440 can be charged by having precedence over the main battery 420.

According to one embodiment of the present invention, since the backup battery 440 is built in the main board 410, although the main battery 420 is separated from the mobile terminal 400, the backup battery 440 can supply a power to the mobile terminal 400. And, the backup battery 440 400 can be embodied in the former battery 191 shown in FIG. 1C.

The main battery 420 can be detachably attached to the replacement module 430. For instance, in order to charge the main battery 420, a user separates the replacement module 430 from the mobile terminal 400 in the first place and is then able to separate the main battery 420 from the replacement module 430. Moreover, after the user has loaded the charged main battery 420 into the replacement module 430, the user can load the replacement module 430 into the mobile terminal 400. And, the main battery 430 may be embodied in the former battery 191 shown in FIG. 1C.

In order to facilitate the main battery 420 to be loaded/unloaded for user's convenience, the replacement module 430 can be provided to a bottom end of the mobile terminal 400. And, the replacement module 430 can be configured to enable the main battery 420 to be detachably loaded. Moreover, the replacement module 430 may have a circuit configured to transceive electronic signals with the main board 410.

In the following description, embodiments related to a controlling method implementable in the above-configured mobile terminal shall be described with reference to the accompanying drawings. It will be appreciated by those skilled in the art that the present invention can be specified into other form(s) without departing from the spirit or scope of the inventions.

In the following description, embodiments of the present invention are described in detail with reference to FIG. 5 to FIG. 22. In describing and understanding embodiments of the present invention, the former description with reference to FIGS. 1 to 4 can be referred to. Moreover, the above-mentioned mobile terminal may include a mobile terminal according to one embodiment of the present invention. Namely, a mobile terminal according to one embodiment of the present invention or an external terminal can be embodied into one of the mobile terminals 100, 200, 300 and 400 shown in FIGS. 1 to 4. Particularly, a mobile terminal according to one embodiment of the present invention can be assumed as including the detachable-type battery shown in FIG. 4.

Figure 5:
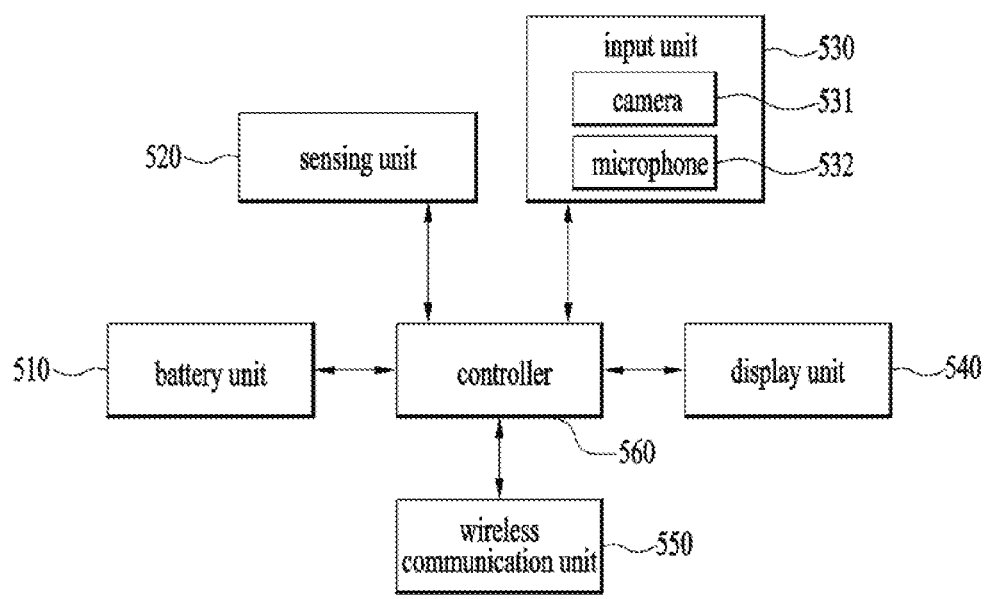
FIG. 5 is a block diagram to describe configuration modules of a mobile terminal according to one embodiment of the present invention.

FIG. 5 is a block diagram to describe configuration modules of a mobile terminal according to one embodiment of the present invention.

Referring to FIG. 5, a mobile terminal according to one embodiment of the present invention may include a battery unit 510, a sensing unit 520, an input unit 530, a display unit 540, a wireless communication unit 550 and a controller 560.

The battery unit 510 may include a main battery and a backup battery. In this case, the main battery and the backup battery may be embodied in the former main battery 420 and the former backup battery 440 shown in FIG. 4. According to one embodiment of the present invention, the mobile terminal can determine whether a battery swap mode is entered. In doing so, the battery swap mode may include a state that the main battery is separated or detached from the mobile terminal. And, according to one embodiment of the present invention, the mobile terminal can sense a residual quantity of the backup battery and is able to determine a content operating mode based on the sensed residual quantity of the backup battery.

The sensing unit 520 senses use's various inputs to the mobile terminal and an environment of the mobile terminal and then delivers a sensing result to enable to controller 560 to perform a corresponding operation. According to the present invention, the sensing unit 520 is provided to the display unit 540 so as to be embodied in a touchscreen. According to the present invention, the sensing unit 520 can be embodied in the sensing unit 140 shown in FIG. 1A or the sensing unit 340 shown in FIG. 3B. According to one embodiment of the present invention, the sensing unit 520 can sense a residual quantity of each of the main battery and the backup battery. According to one embodiment of the present invention, the sensing unit 520 can sense input signals for launching various contents such as a video shooting, an audio recording, a video play, a music play and the like.

The input unit 530 may include a camera 531 and a microphone 532.

The camera 531 can process or handle an image frame of a still image, a video or the like obtained by an image sensor. According to the present invention, the camera 531 can be embodied in each of the cameras 121, 121*a* and 121*b* shown in FIGS. 1A to 1C. According to one embodiment of the present invention, the camera 531 can take a video.

The microphone 532 can process an external audio or sound signal into an electrical audio data. According to the present invention, the microphone 532 can be embodied in the microphone 122 shown in FIG. 1A or the microphone 322 shown in FIG. 3A. According to one embodiment of the present invention, the microphone 532 can sense an audio or voice input.

The display unit 540 can display visual information. In this case, the visual information may include text, indicator, icon, content, application, image, video and the like. The display unit 540 can output visual information to a screen based on a control command of the controller 550. According to the present invention, the display unit 540 can be embodied in the display 151 shown in FIG. 1A or the display unit 540 shown in FIG. 3A. According to one embodiment of the present invention, the display unit 540 can output minimum information for launching or operating a currently run content in response to a content operating mode only.

The wireless communication unit 550 performs a communication using various protocols between a mobile terminal and an external device and is able to transmit/receive data signals. According to the present invention, the wireless communication unit 550 may be embodied in the wireless communication unit 110 shown in FIG. 1A. In particular, the mobile terminal can transceive data with an external terminal through the wireless communication unit 550 using one of the broadcast receiving module 111, the mobile communication module 112, the wireless internet module 113 and the short range communication module 114. According to one embodiment of the present invention, the wireless communication unit 550 can transmit a control signal, which controls the external terminal to run a content currently run in the mobile terminal in response to a content operating mode, to the external terminal. Moreover, in the following description, it is able to assume a state that the mobile terminal and the external terminal are paired with each other.

The controller 560 processes data, controls the aforementioned respective units of the mobile terminal, and controls data transmissions/receptions among the units. According to the present invention, the controller 560 can be embodied in the controller 180 shown in FIG. 1A.

According to one embodiment of the present invention, operations performed by the mobile terminal can be controlled by the controller 560. Yet, for clarity of the following description, such operations are described as performed/controlled by the mobile terminal in general.

Figure 6:
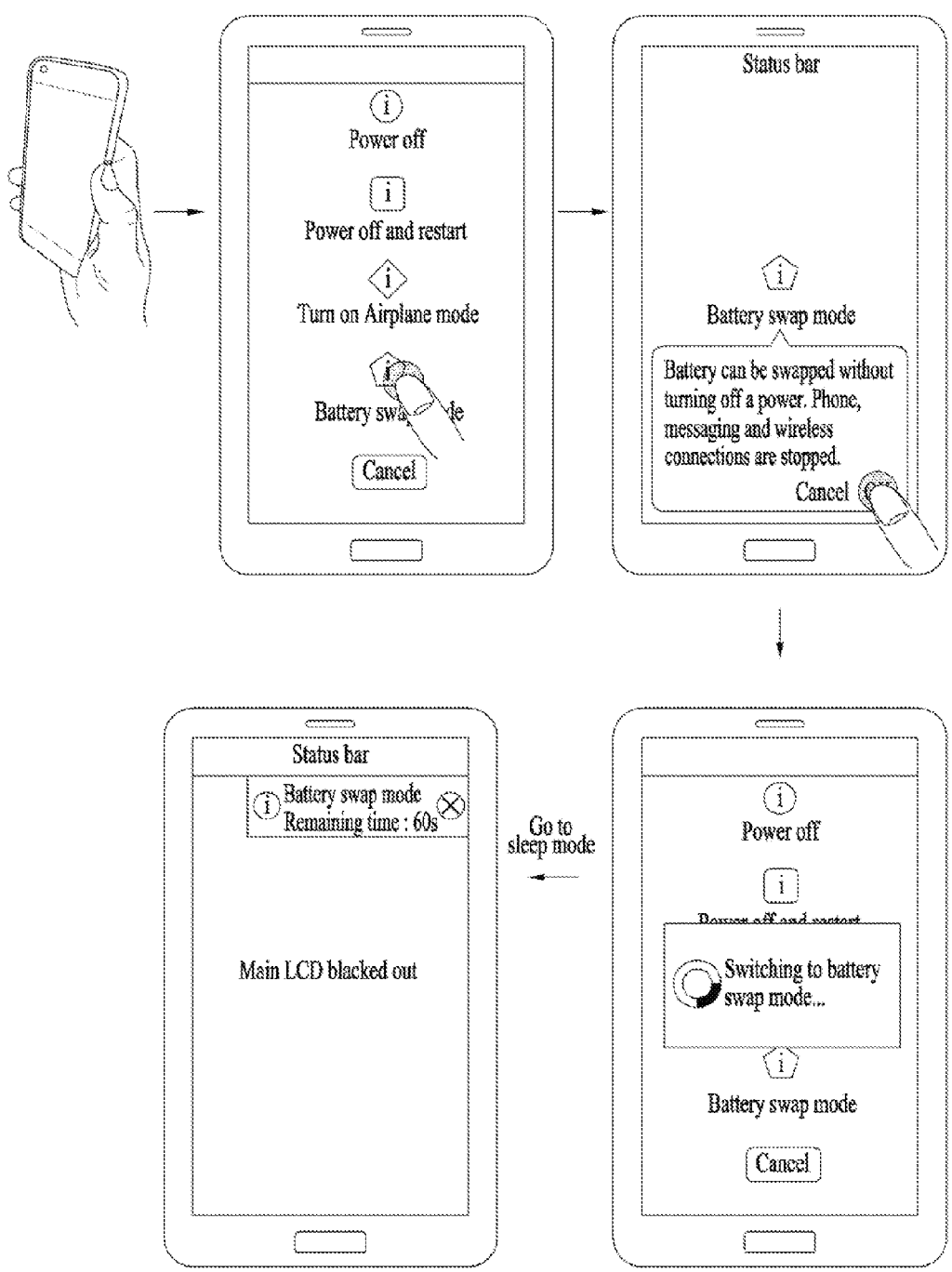
FIG. 6 is a diagram to describe one example of entering a battery swap mode according to one embodiment of the present invention.

FIG. 6 is a diagram to describe one example of entering a battery swap mode according to one embodiment of the present invention.

Referring to a first diagram of FIG. 6, a mobile terminal can sense a first input signal. In this case, the first input signal may correspond to a long touch input signal of long pressing a power button.

Referring to a second diagram of FIG. 6, as the mobile terminal receives the first input signal, it is able to output a power option on a display unit. In this case, the power option may include a power off, a restart, an airplane mode, and a battery swap mode. According to one embodiment of the present invention, the mobile terminal can sense a second input signal of selecting the battery swap mode.

Referring to a third diagram of FIG. 6, as the mobile terminal sense the second input signal, it is able to output a popup window for indicating the battery swap mode on the display unit. In this case, the popup window may further include an icon for selecting whether to launch the battery swap mode. According to one embodiment of the present invention, the mobile terminal can sense a third input signal of selecting the icon of launching the battery swap mode.

Referring to fourth and fifth diagrams of FIG. 6, as the mobile terminal senses the third input signal, it is able to enter the battery swap mode. In case of entering the battery swap mode, the mobile terminal can change the display unit into a deactivated state. In this case, the deactivated state may include a black-out state in which the display unit outputs nothing.

According to one embodiment of the present invention, in case of entering the battery swap mode, the mobile terminal can count and output a swappable time of the battery swap mode. In this case, the swappable time of the battery swap mode can be determined based on a capacity of a backup battery built in the mobile terminal. For instance, the swappable time of the battery swap mode may be 60 seconds. In this case, the mobile terminal can output the swappable time in a manner of counting 60 seconds from a timing of entering the battery swap mode. In doing so, since the display unit is in the deactivated state, the mobile terminal can output the swappable time of the battery swap mode to a sub-display unit or a top end region (e.g., a status bar) of the display unit.

Figure 7:
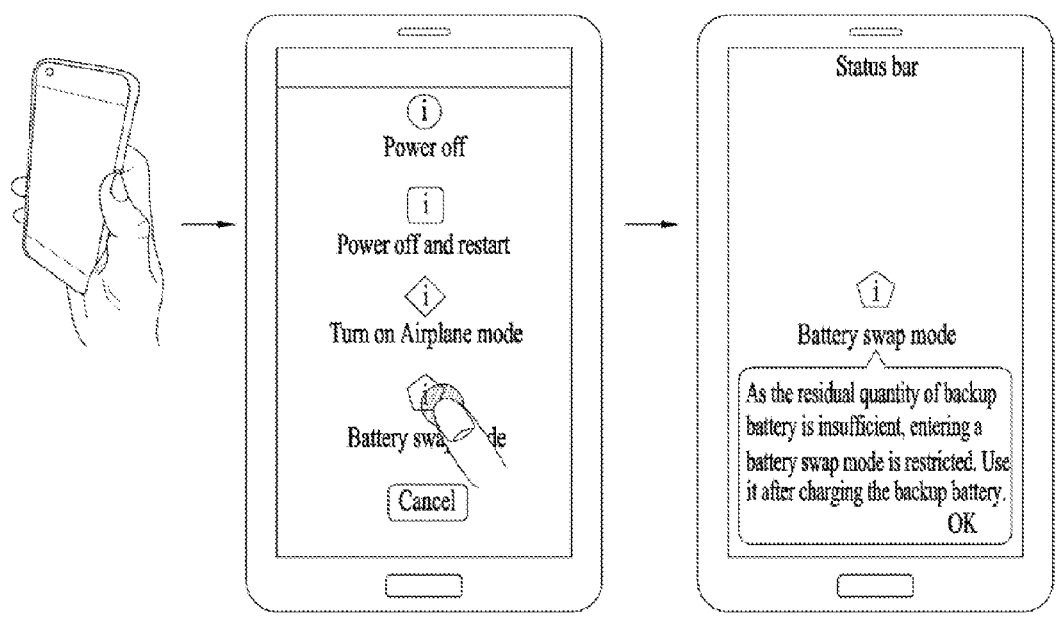
FIG. 7 is a diagram to describe one example of entering a battery swap mode according to another embodiment of the present invention.

FIG. 7 is a diagram to describe one example of entering a battery swap mode according to another embodiment of the present invention.

First and second diagrams of FIG. 7 may correspond to the first and second diagrams of FIG. 6. Referring to the second diagram of FIG. 7, a mobile terminal can sense a second input signal of selecting a battery swap mode.

Referring to a third diagram of FIG. 7, if the mobile terminal senses the second input signal of selecting the battery swap mode, it is able to sense a residual quantity of a backup battery. Unlike FIG. 6, if the sensed residual quantity of the backup battery is not enough to use the battery swap mode, the mobile terminal can output a popup window for indicating that the battery swap mode cannot be launched. Hence, although the mobile terminal senses the second input signal, it may not enter the battery swap mode.

Figure 8:
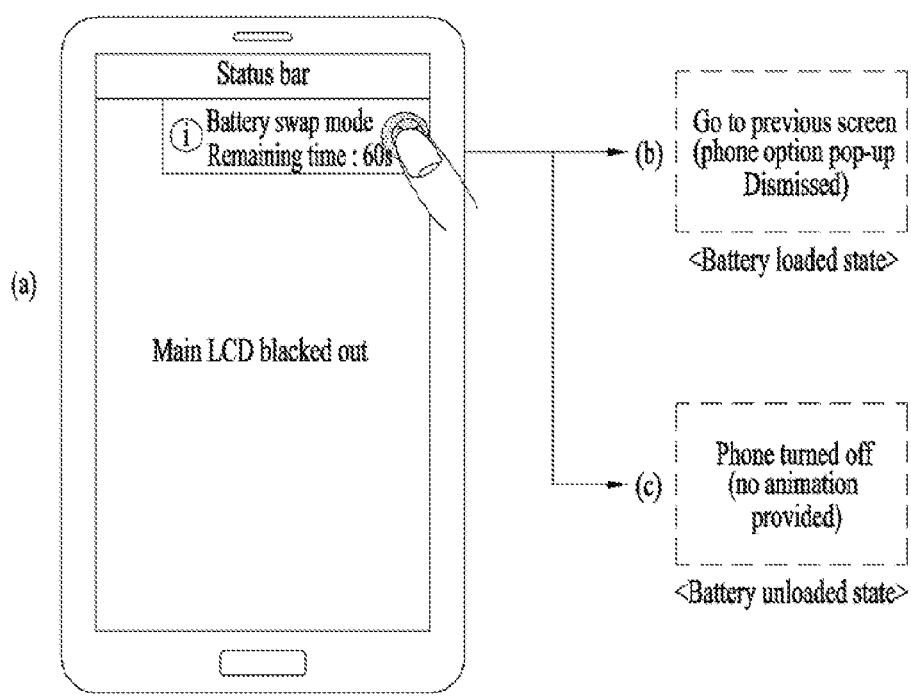
FIG. 8 is a diagram to describe one example of cancelling a battery swap mode according to one embodiment of the present invention.

FIG. 8 is a diagram to describe one example of cancelling a battery swap mode according to one embodiment of the present invention. In the following description of an embodiment with reference to FIG. 8, description redundant with the former description with reference to FIG. 6 or FIG. 7 shall be omitted.

FIG. 8 (*a*) may correspond to the fifth diagram of FIG. 6. Referring to FIG. 8 (*a*), a mobile terminal enters a battery swap mode and is then able to switch a display unit to a deactivated state. While the display unit is in the deactivated state, the mobile terminal can count and output a swappable time of the battery swap mode. And, the mobile terminal may further output an indicator for ending the battery swap mode.

According to one embodiment of the present invention, if the mobile terminal senses a first input signal of selecting the indicator for ending the battery swap mode, it is able to perform an example shown in FIG. 8 (*b*) or FIG. 8 (*c*) depending on whether a main battery is loaded. FIG. 8 (*b*) is a diagram to describe a state that the main battery is loaded into the mobile terminal in case that the mobile terminal senses the first input signal. FIG. 8 (*c*) is a diagram to describe a case that the main battery is not loaded into the mobile terminal in case that the mobile terminal senses the first input signal.

Referring to FIG. 8 (*b*), in case of sensing the first input signal, the mobile terminal can output a previous screen to a display unit. In this case, the previous screen may correspond to a screen outputted right before the battery swap mode is entered. If the mobile terminal senses the first input signal, it is able to output a popup window for indicating that the previous screen will be outputted to the display unit.

Referring to FIG. 8 (*c*), in case of sensing the first input signal, the mobile terminal can turn off a power of the mobile terminal. In particular, while the main battery is not loaded into the mobile terminal, if the mobile terminal senses an input signal of ending the battery swap mode, the mobile terminal can turn off the power of its own.

Figure 9:
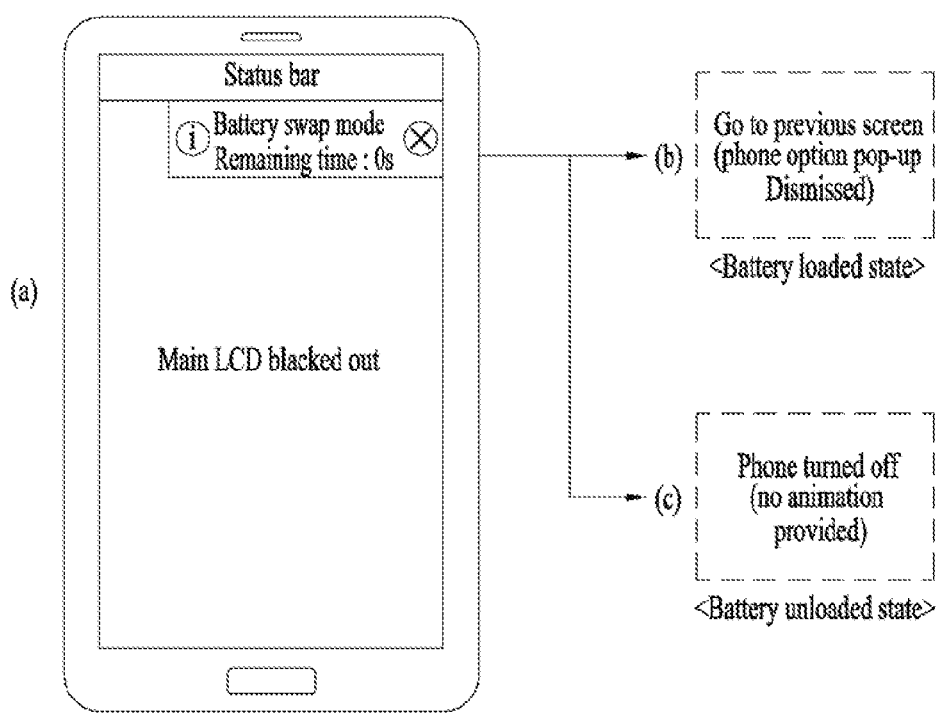
FIG. 9 is a diagram to describe one example of ending a battery swap mode according to one embodiment of the present invention.

FIG. 9 is a diagram to describe one example of ending a battery swap mode according to one embodiment of the present invention. In the following description of an embodiment with reference to FIG. 9, description redundant with the former description with reference to FIGS. 6 to 8 shall be omitted.

FIG. 9 (*a*) may correspond to the fifth diagram of FIG. 6. If a mobile terminal enters a battery swap mode, it is able to count and output a swappable time of the battery swap mode. FIG. 9 (*b*) and FIG. 9 (*c*) are diagrams to describe a case that the swappable time has expired. In the following description, a case that the swappable time of the battery swap mode is 60 seconds is described by being taken as one example. First of all, if 60 seconds expires since entering the battery swap mode, the mobile terminal can perform the embodiment shown in FIG. 9 (*b*) or FIG. 9 (*c*) depending on whether a main battery is loaded. FIG. 9 (*b*) is a diagram to describe a case that the main battery is loaded into the mobile terminal if the swappable time expires. FIG. 9 (*c*) is a diagram to describe a case that the main battery is not loaded into the mobile terminal if the swappable time expires.

Referring to FIG. 9 (*b*), if the swappable time of the battery swap mode expires, the mobile terminal can output a previous screen to a display unit. Moreover, if the swappable time of the battery swap mode expires, the mobile terminal is able to output a popup window for indicating that the previous screen will be outputted to the display unit.

Referring to FIG. 9 (*c*), if the swappable time of the battery swap mode expires, the mobile terminal can turn off a power of the mobile terminal. In particular, while the main battery is not loaded into the mobile terminal, if the swappable time of the battery swap mode expires, the mobile terminal can turn off the power of its own.

Figure 10:
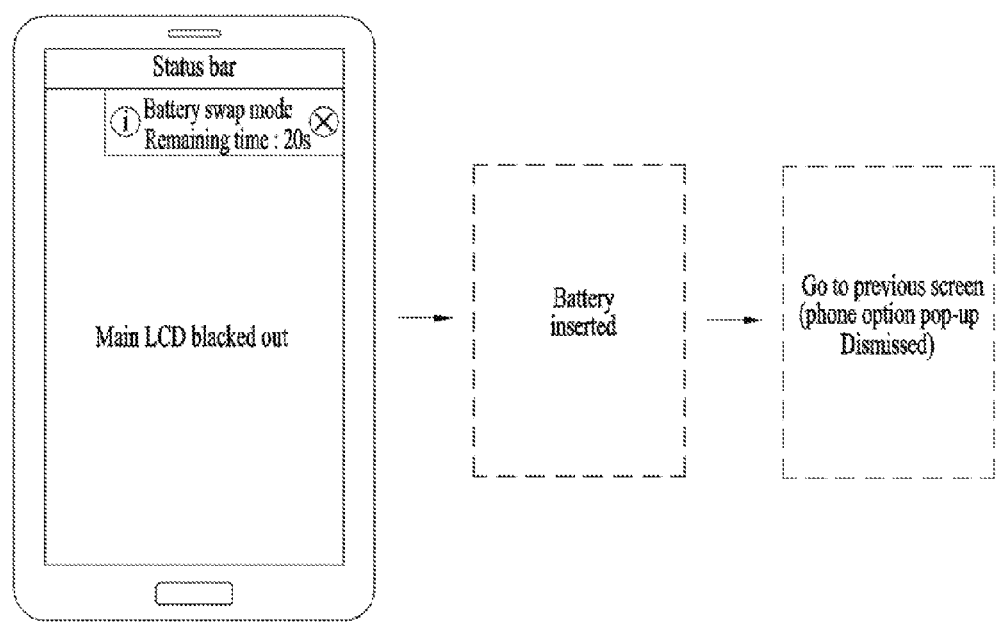
FIG. 10 is a diagram to describe one example of ending a battery swap mode according to another embodiment of the present invention.

FIG. 10 is a diagram to describe one example of ending a battery swap mode according to another embodiment of the present invention. In the following description of an embodiment with reference to FIG. 10, description redundant with the former description with reference to FIGS. 6 to 9 shall be omitted.

A first diagram of FIG. 10 may correspond to the fifth diagram of FIG. 6. A mobile terminal is able to count and output a swappable time of a battery swap mode. For instance, the swappable time of the battery swap mode may be 60 seconds.

According to one embodiment of the present invention, while the swappable time of the battery swap mode is remaining, the mobile terminal can sense that a main battery is loaded into the mobile terminal. For instance, when the remaining swappable time of the battery swap mode is 20 seconds, a user can load the main battery into the mobile terminal.

Referring to second and third diagrams of FIG. 10, the mobile terminal can output a popup window indicating that the main battery has been loaded into the mobile terminal. As the main battery is loaded into the mobile terminal, the mobile terminal can end the battery swap mode. As the battery swap mode is ended, the mobile terminal can output a previous screen to a display unit.

Figure 11:
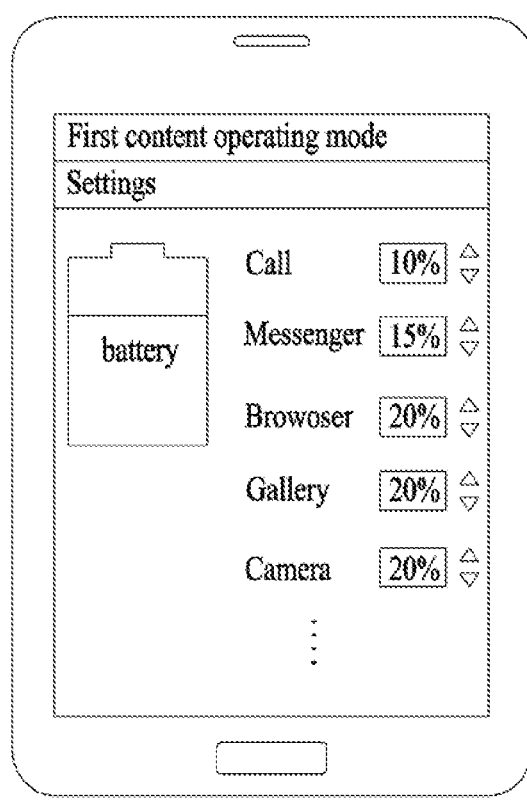
FIG. 11 is a diagram to describe one example of determining a content operating mode based on a content according to one embodiment of the present invention.

FIG. 11 is a diagram to describe one example of determining a content operating mode based on a content according to one embodiment of the present invention. In the following description of an embodiment with reference to FIG. 11, description redundant with the former description with reference to FIGS. 4 to 10 shall be omitted.

Referring to FIG. 11, while a content is run, if a battery swap mode is entered, a mobile terminal can determine a content operating mode based on a residual quantity of a backup battery. In this case, the content operating mode may be classified into 3 steps. For example, the content operating mode may include a first content operating mode for controlling a currently run content to be run in an external terminal, a second content operating mode for outputting a minimum information for running a currently run content, and a third content operating mode for maintain the running of a currently run content. The detailed embodiment of the content operating mode shall be described in detail with reference to FIGS. 12 to 21 later. The classification of the content operating mode into 3 content operating modes on the basis of a residual quantity of the backup battery is just one example. And, it is a matter of course that the content operating mode can be classified into 3 or more content operating modes.

According to one embodiment of the present invention, a mobile terminal can set a different reference of a residual quantity of a backup battery to determine a content operating mode. In particular, the mobile terminal can determine the content operating mode in consideration of both a currently run content and a residual quantity of the backup battery.

While a call application is run in a mobile terminal, one example of entering a battery swap mode is described by being taken as one example. If a residual quantity of a backup battery is equal to or smaller than 30%, a mobile terminal can determine to launch a first content operating mode. If a residual quantity of a backup battery is equal to or smaller than 20%, a mobile terminal can determine to launch a second content operating mode. If a residual quantity of a backup battery is 50% or more, a mobile terminal can determine to launch a third content operating mode.

In particular, although a battery swap mode is entered, if the mobile terminal determines that the residual quantity of the backup battery remains enough to maintain the running of a currently run content, the mobile terminal can launch the third content operating mode for maintaining the running of the currently run content. When the battery swap mode is entered, if the mobile terminal determines that the residual quantity of the backup battery is very insufficient, the mobile terminal can launch the second content operating mode for outputting a minimum information for running the currently run content.

According to one embodiment of the present invention, the residual quantity reference of the backup battery for determining the aforementioned content operating mode may be determined as a default value or a random value set by a user.

The following description is made by taking the call application as one example. First of all, while the call application is run, if the battery swap mode is entered, the mobile terminal can determine the content operating mode with reference to 'below 20%' 'below 30%', or 'above 50%' of the residual quantity of the backup battery. Regarding this, while the call application is run, if the battery swap mode is entered, a user can set the mobile terminal to determine the content operating mode with reference to 'below 20%' or 'above 30%'. Yet, the mobile terminal may require a minimum condition, which is provided to launch the content operating mode determined in consideration of capability of the backup battery, as a default value.

Moreover, according to one embodiment of the present invention, a user can set a residual quantity reference of a backup battery, which is different per content. For instance, in order to operate the first content operating mode, in case of the call application, it is able to set a case that the residual quantity of the backup battery is 20% or less. In case of SMS application, it is able to set a case that the residual quantity of the backup battery is 10% or less. In case of a gallery application, it is able to set a case that the residual quantity of the backup battery is 50% or less.

Content Operating Mode Based on Residual Quantity of Backup Battery

While a content is run, if a battery swap mode is entered, a mobile terminal can determine a content operating mode based on a residual quantity of a backup battery. In case of entering a battery swap mode, an embodiment for controlling a currently run content in response to a content operating mode is described with reference to FIGS. 12 to 21 as follows.

The mobile terminal can enter the battery swap mode by the method described with reference to FIG. 6. Moreover, the mobile terminal is also able to enter the battery swap mode by sensing that a main battery is detached from the mobile terminal.

Figure 12:
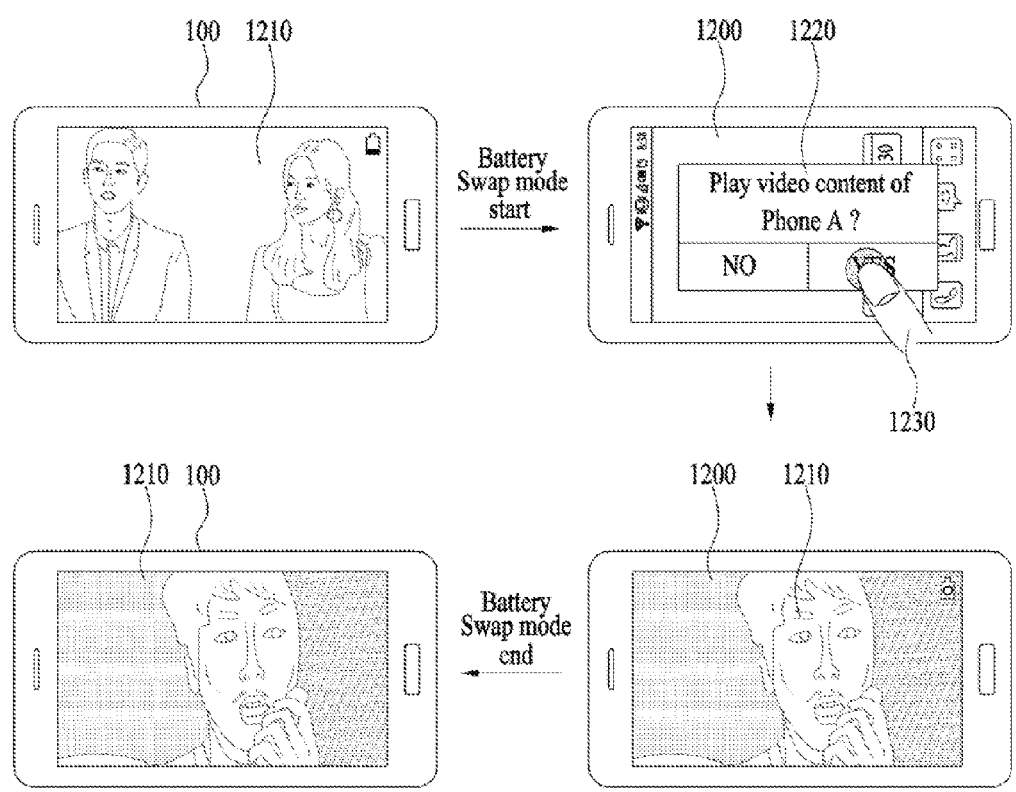
FIG. 12 is a diagram to describe one example of playing a video in an external terminal in response to a content operating mode according to one embodiment of the present invention.
Figure 13:
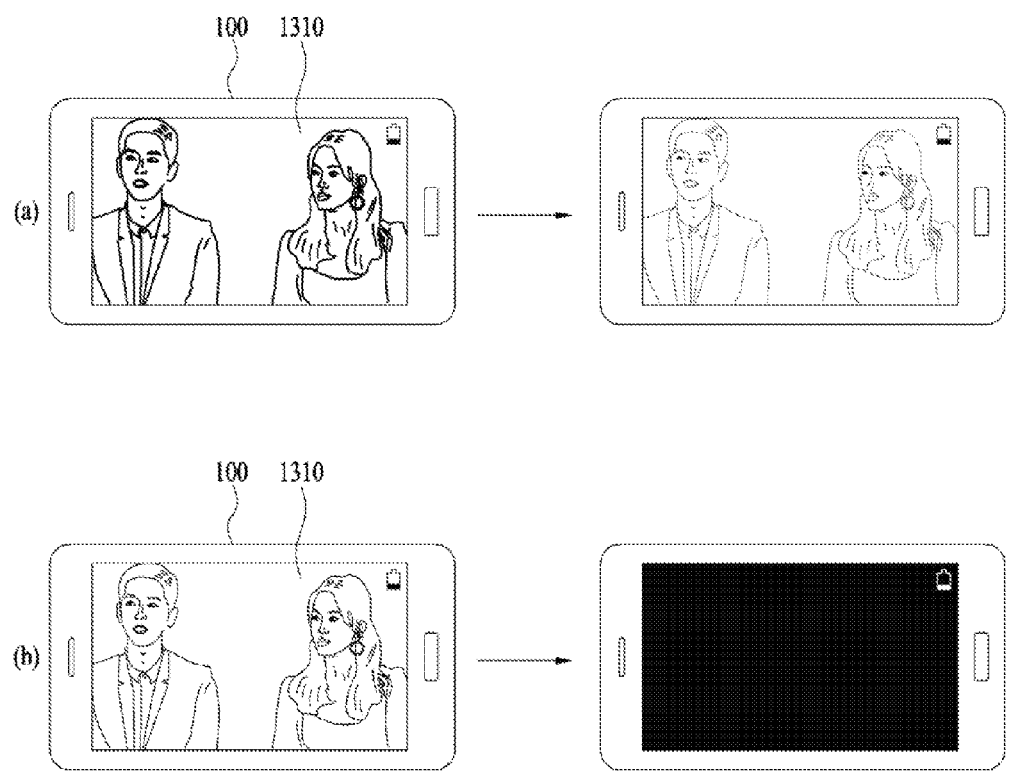
FIG. 13 is a diagram to describe one example of outputting a minimum information only in playing a video in response to a content operating mode according to one embodiment of the present invention.
Figure 14:
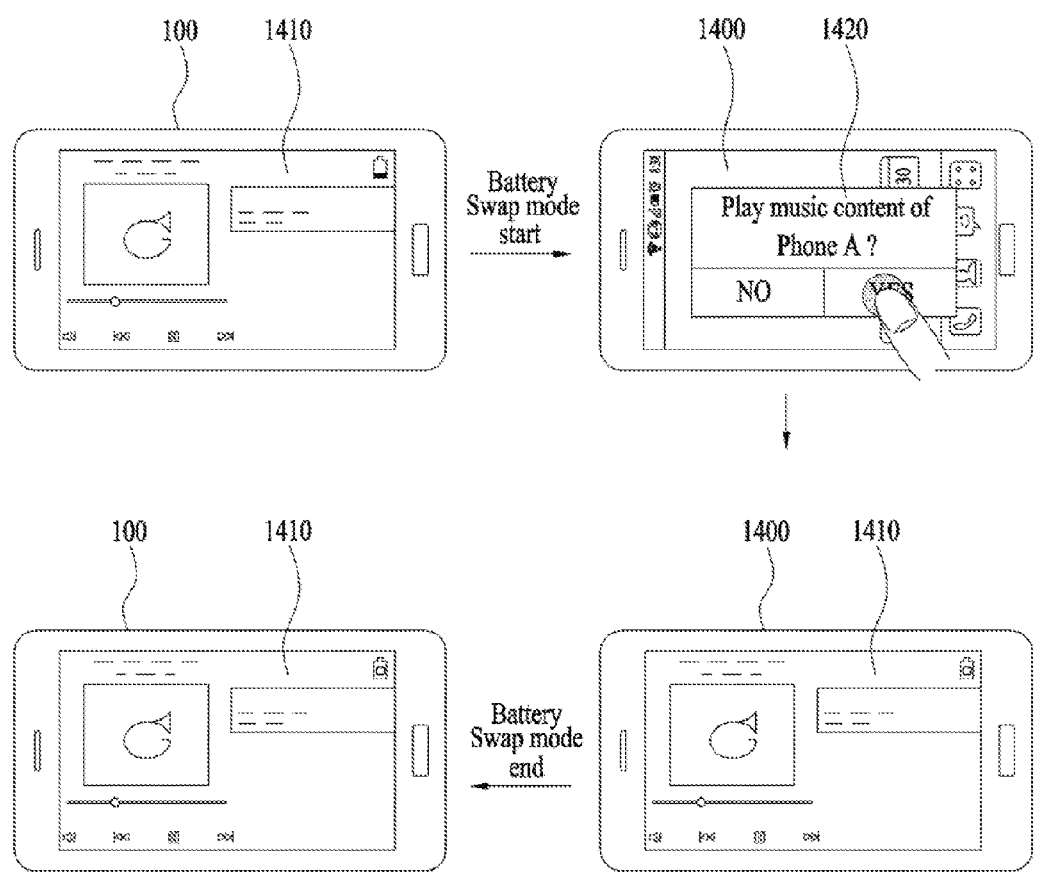
FIG. 14 is a diagram to describe one example of playing a music in an external terminal in response to a content operating mode according to one embodiment of the present invention.
Figure 15:
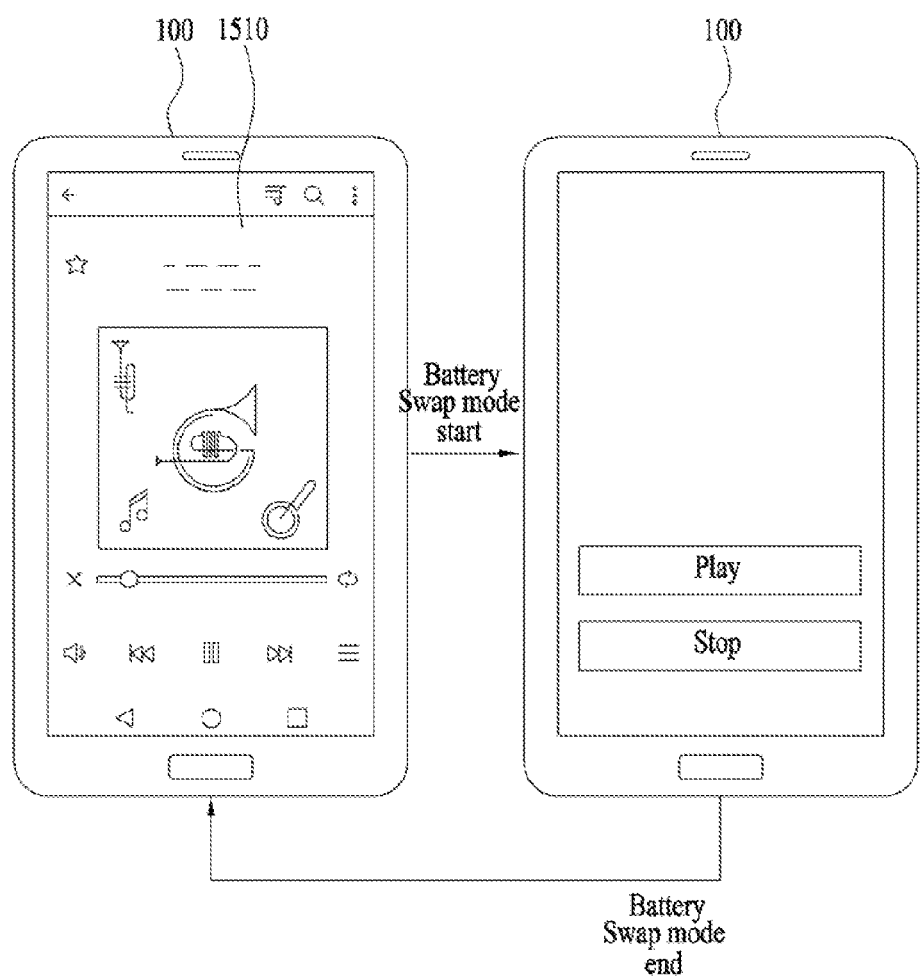
FIG. 15 is a diagram to describe one example of outputting a minimum information only in playing a music in response to a content operating mode according to one embodiment of the present invention.
Figure 16:
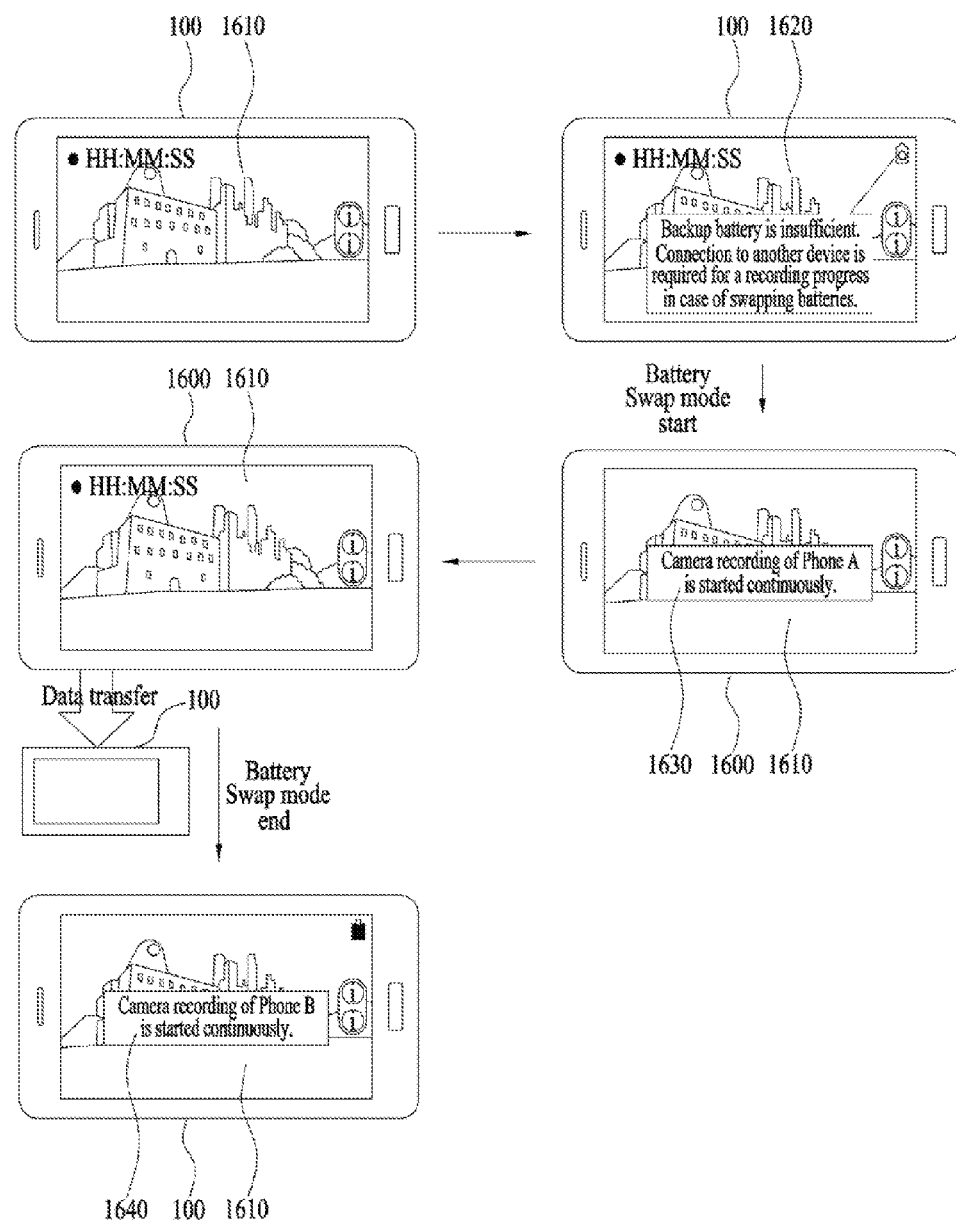
FIG. 16 is a diagram to describe one example of shooting a video in an external terminal in response to a content operating mode according to one embodiment of the present invention.
Figure 17:
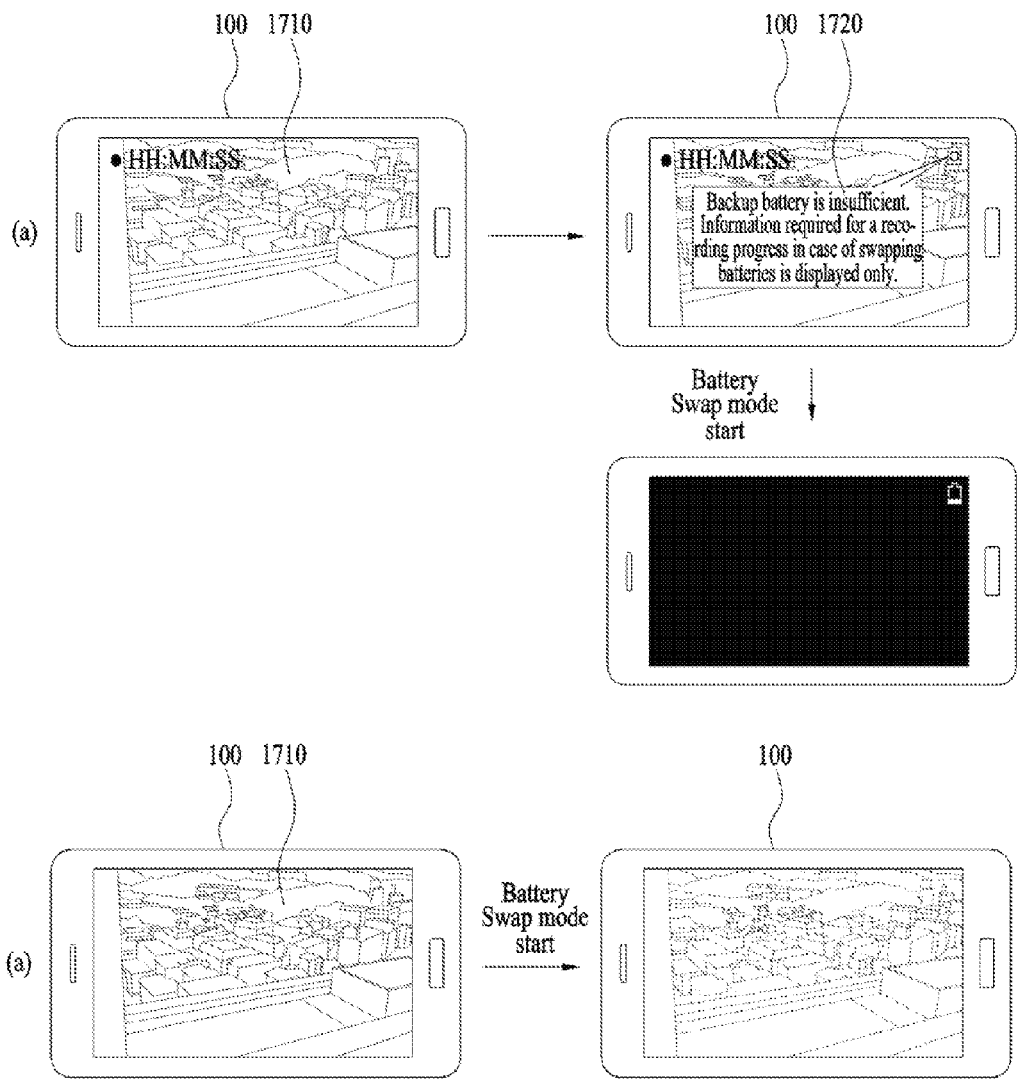
FIG. 17 is a diagram to describe one example of outputting a minimum information only in shooting a video in response to a content operating mode according to one embodiment of the present invention.
Figure 18:
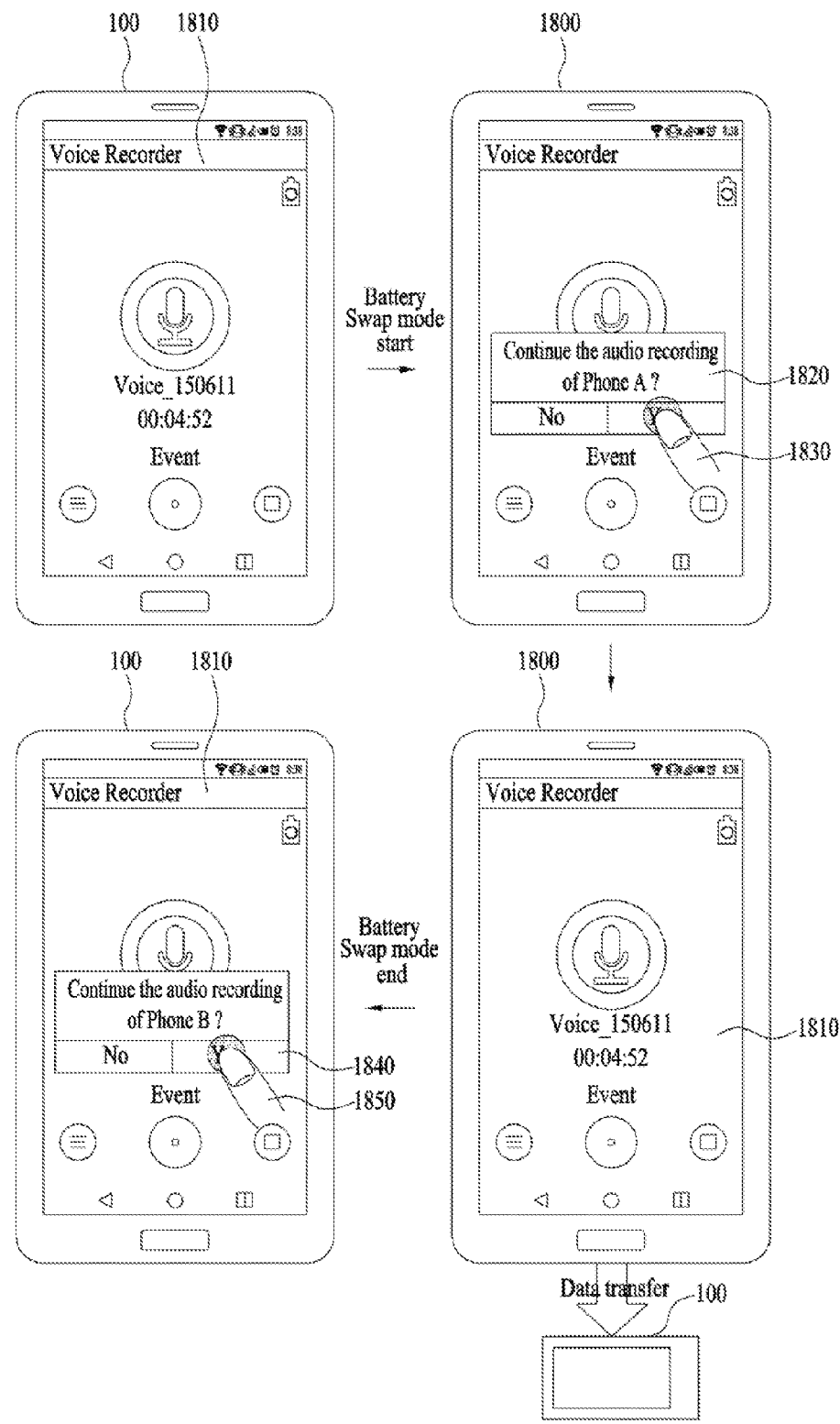
FIG. 18 is a diagram to describe one example of recording an audio in an external terminal in response to a content operating mode according to one embodiment of the present invention.
Figure 19:
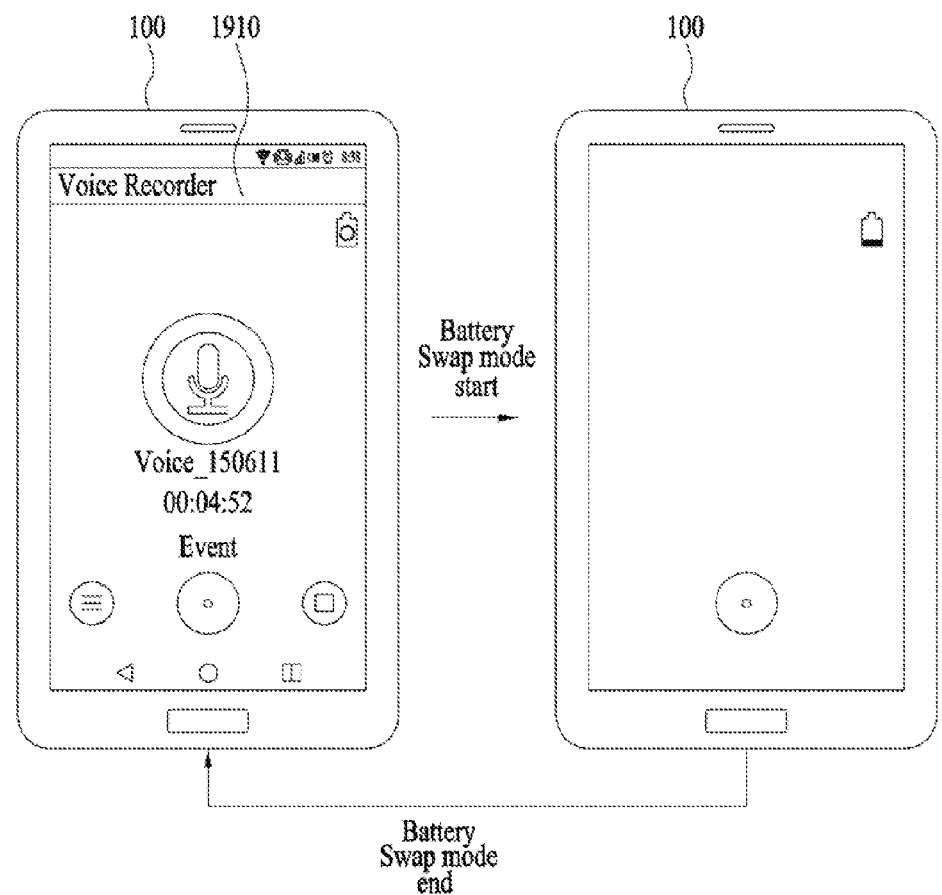
FIG. 19 is a diagram to describe one example of outputting a minimum information only in recording an audio in response to a content operating mode according to one embodiment of the present invention.
Figure 20:
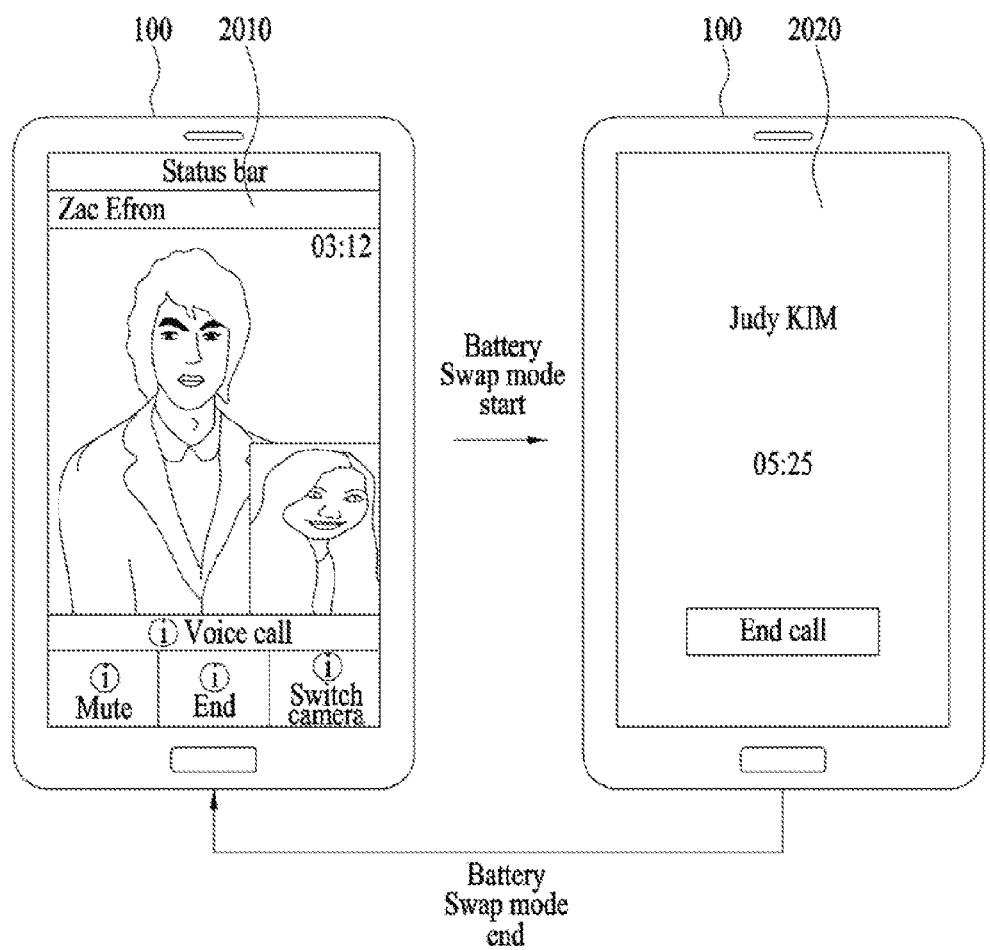
FIG. 20 is a diagram to describe one example of outputting a minimum information only in making a video call in response to a content operating mode according to one embodiment of the present invention.
Figure 21:
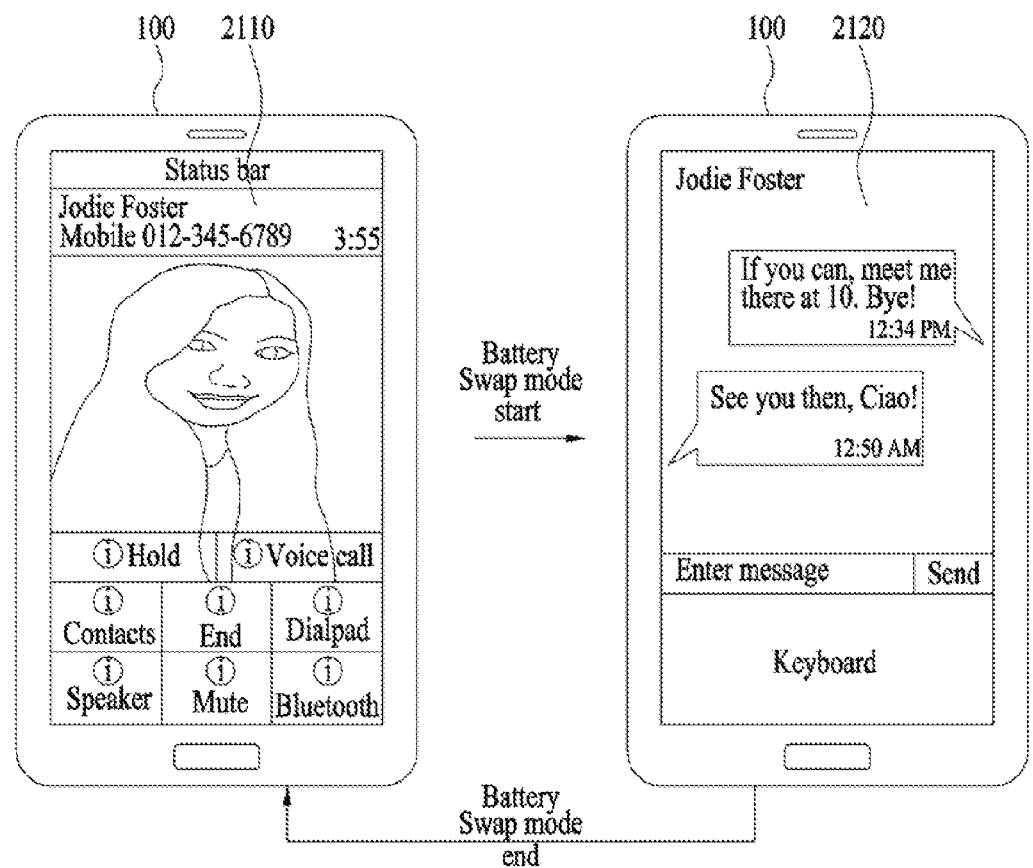
FIG. 21 is a diagram to describe one example of changing a mode in the course of a voice call in response to a content operating mode according to one embodiment of the present invention.

Particularly, FIG. 12 and FIG. 13 are diagrams to describe embodiments of playing a video content, FIG. 14 and FIG. 15 are diagrams to describe embodiments of playing a music content, FIG. 16 and FIG. 17 are diagrams to describe embodiments of shooting a video content, FIG. 18 and FIG. 19 are diagrams to describe embodiments of recording an audio, FIG. 20 is a diagram to describe an embodiment of a video call, and FIG. 21 is a diagram to describe an embodiment of a voice call.

FIG. 12 is a diagram to describe one example of playing a video in an external terminal in response to a content operating mode according to one embodiment of the present invention. In the following description of an embodiment with reference to FIG. 12, description redundant with the former description with reference to FIG. 11 shall be omitted.

Referring to a first diagram of FIG. 12, a mobile terminal 100 can play a video content 1210. While the video content 1210 is played, if a battery swap mode is entered, the mobile terminal 100 can sense a residual quantity of a backup battery. In particular, if sensing that a main battery is detached from the mobile terminal 100, the mobile terminal 100 can sense the residual quantity of the backup battery. In the following description, assume a case that the residual quantity of the backup battery remains enough to transmit a currently run content to an external terminal 1200.

According to one embodiment of the present invention, the mobile terminal 100 can determine a content operating mode based on the residual quantity of the backup battery. In doing so, the mobile terminal 100 can determine the content operating mode as a first content operating mode. In this case, the first content operating mode may correspond to a mode for controlling a currently run content to be run in the external terminal 1200.

According to one embodiment of the present invention, if the content operating mode is determined as the first content operating mode, the mobile terminal 100 can transmit a control signal, which controls the video content 1210 currently played in the mobile terminal 100 to be run in the external terminal 1200, to the external terminal 1200.

According to one embodiment of the present invention, if the battery swap mode is entered, the mobile terminal 100 can transmit image data for playing the video content 1210 to the external terminal 1200 using the backup battery. In doing so, the mobile terminal 100 can transmit the image data playable for an estimated time (e.g., 60 seconds) until ending the battery swap mode from an ending timing of the video content 1210 in the mobile terminal 100. For instance, if the video content 1210 is a video amounting to total 10 minutes, the mobile terminal 100 plays the video content 1210 up to 3 minutes 10 seconds and is then able to enter the battery swap mode. In this case, the mobile terminal 100 can transmit the image data ranging 3 minutes 10 seconds to 4 minutes 10 seconds of the video content 1210 to the external terminal 1200.

According to one embodiment of the present invention, if the battery swap mode is entered, the mobile terminal 100 can end a play of the video content 1210. Namely, while the main battery is swapped, the mobile terminal 100 stops using the main battery by ending the play of the video content 1210 and is able to transmit a control signal to the external terminal 1200 using the backup battery. For instance, the mobile terminal 100 plays the video content 1210 up to 3 minutes 10 seconds and is then able to end the play of the video content 1210.

Referring to second and third diagrams of FIG. 12, having received the control signal for controlling the video content 1210 to be run from the mobile terminal 100, the external terminal 1200 can output a popup window 1220 querying whether to play the video content 1210.

According to one embodiment of the present invention, if the external terminal 1200 senses an input signal 1230 for controlling the video content 1210 to be played, it is able to play the video content 1210 using the image data received from the mobile terminal 100. In this case, the input signal 1230 may correspond to an input signal of touching an icon for playing the video content 1210 in the outputted popup window 1220. For instance, the external terminal 1200 can play the video content 1210 starting at 3 minutes 10 seconds.

Referring to a fourth diagram of FIG. 12, if the battery swap mode is ended, the mobile terminal 100 can resume the stopped play of the video content 1210. In particular, if the main battery is loaded into the mobile terminal 100, the mobile terminal 100 can resume the stopped play of the video content 1210. In doing so, the mobile terminal 100 can resume the stopped play of the video content 1210 starting at a first timing. In this case, the first timing may correspond to a timing of stopping the play of the video content 1210 run in the external terminal 1200 in response to the control signal. For instance, when the video content 1210 is played up to 3 minutes 40 seconds in the external terminal 1200, if the mobile terminal 100 senses that the battery swap mode is ended, the mobile terminal 100 can resume the play of the video content 1210 staring at 3 minutes 40 seconds.

Moreover, if the battery swap mode is ended, the mobile terminal 100 can transmit a control signal for ending the play of the video content 1210 to the external terminal 1200 [not shown in the drawing]. Hence, if the battery swap mode of the mobile terminal 100 is ended, the external terminal 1200 can end the play of the video content 1210.

FIG. 13, FIG. 15, FIG. 17, FIG. 19 and FIG. 20 are diagrams to describe embodiments of outputting minimum information for operating a content currently run in a mobile terminal in case of entering a battery swap mode. In FIG. 13, FIG. 15, FIG. 17, FIG. 19 and FIG. 20, assume a case that a residual quantity of a backup battery remains enough to output minimum information for operating a currently run content. Hence, according to the embodiments shown in FIG. 13, FIG. 15, FIG. 17, FIG. 19 and FIG. 20, if a mobile terminal enters a battery swap mode, it is able to determine a content operating mode as a second content operating mode.

FIG. 13 is a diagram to describe one example of outputting a minimum information only in playing a video in response to a content operating mode according to one embodiment of the present invention. In the following description of an embodiment with reference to FIG. 13, description redundant with the former description with reference to FIG. 11 or FIG. 12 shall be omitted.

Referring to FIG. 13, a mobile terminal can play a video content 1310. While the video content 1310 is played, if a battery swap mode is entered, the mobile terminal 100 can sense a residual quantity of a backup battery.

FIG. 13 (*a*) is a diagram to describe an embodiment of playing the video content 1310 in black and white mode in the mobile terminal 100, and FIG. 13 (*b*) is a diagram to describe an embodiment of outputting sound only.

Referring to a first diagram of FIG. 13 (*a*), while the video content 1310 is played, if the battery swap mode is entered, the mobile terminal 100 can sense the residual quantity of the backup battery. According to one embodiment of the present invention, the mobile terminal 100 can determine a content operating mode based on the residual quantity of the backup battery. In doing so, the mobile terminal 100 can determine the content operating mode as a second content operating mode. In this case, the second content operating mode may correspond to a mode of outputting minimum information for operating a currently run content to a display unit only.

Referring to a second diagram of FIG. 13 (*a*), if the content operating mode is determined as the second content operating mode, the mobile terminal 100 can output only minimum information for playing the video content 1310. In doing so, the minimum information may include black and white information of the video content 1310. In particular, while the video content 1310 is played, if the main battery is detached from the mobile terminal 100, the mobile terminal 100 can output the currently played video content 1310 in black and white. In doing so, the mobile terminal 100 can play the video content 1310 in black and white using the backup battery.

Referring to a first diagram of FIG. 13 (*b*), while the video content 1310 is played, if the battery swap mode is entered, the mobile terminal 100 can sense the residual quantity of the backup battery. The mobile terminal 100 can determine a content operating mode as a second content operating mode based on the sensed residual quantity of the backup battery.

Referring to a second diagram of FIG. 13 (*b*), if the content operating mode is determined as the second content operating mode, the mobile terminal 100 can output only minimum information for playing the video content 1310. In doing so, the minimum information may include sound information of the video content 1310. In particular, while the video content 1310 is played, if the main battery is detached from the mobile terminal 100, the mobile terminal 100 stops outputting image data of the currently played video content 1310 and is able to output audio data only.

Moreover, while the video content 1210 is played in the second content operating mode, if the mobile terminal 100 senses that the battery swap mode is ended, the mobile terminal 100 can play the video content 1310 in original form [not shown in the drawing].

In particular, since the mobile terminal 100 can control a content to be run using a minimum battery in accordance with a residual quantity of the backup battery, it may not end a currently run content in the course of swapping the main battery.

FIG. 14 is a diagram to describe one example of playing a music in an external terminal in response to a content operating mode according to one embodiment of the present invention. In the following description of an embodiment with reference to FIG. 14, description redundant with the former description with reference to FIGS. 11 to 13 shall be omitted.

Referring to a first diagram of FIG. 14, a mobile terminal 100 can play a music content 1410. While the music content 1410 is played, if a battery swap mode is entered, the mobile terminal 100 can sense a residual quantity of a backup battery. In the following description, assume a case that the residual quantity of the backup battery remains enough to transmit a currently run content to an external terminal 1400.

According to one embodiment of the present invention, the mobile terminal 100 can determine a content operating mode as a first content operating mode based on the residual quantity of the backup battery. In this case, the first content operating mode may correspond to a mode for controlling a currently run content to be run in the external terminal 1400.

According to one embodiment of the present invention, if the content operating mode is determined as the first content operating mode, the mobile terminal 100 can transmit a control signal, which controls the music content 1410 currently played in the mobile terminal 100 to be run in the external terminal 1400, to the external terminal 1200.

According to one embodiment of the present invention, if the battery swap mode is entered, the mobile terminal 100 can end a play of the music content 1410.

Referring to second and third diagrams of FIG. 14, having received the control signal for controlling the music content 1410 to be run from the mobile terminal 100, the external terminal 1200 can output a popup window 1420 querying whether to play the music content 1410.

According to one embodiment of the present invention, if the external terminal 1200 senses an input signal 1430 for controlling the music content 1410 to be played, it is able to play the music content 1410 using the audio data received from the mobile terminal 100.

Referring to a fourth diagram of FIG. 12, if the battery swap mode is ended, the mobile terminal 100 can resume the stopped play of the music content 1410.

FIG. 15 is a diagram to describe one example of outputting a minimum information only in playing a music in response to a content operating mode according to one embodiment of the present invention. In the following description of an embodiment with reference to FIG. 15, description redundant with the former description with reference to FIGS. 11 to 14 shall be omitted.

Referring to a first diagram of FIG. 15, while the music content 1510 is played, if the battery swap mode is entered, the mobile terminal 100 can sense the residual quantity of the backup battery. According to one embodiment of the present invention, the mobile terminal 100 can determine a content operating mode as a second content operating mode based on the sensed residual quantity of the backup battery. In this case, the second content operating mode may correspond to a mode of outputting minimum information for operating a currently run content to a display unit only.

Referring to a second diagram of FIG. 15, if the content operating mode is determined as the second content operating mode, the mobile terminal 100 can output only minimum information for playing the music content 1510. In doing so, the minimum information may include a play or stop icon of the music content 1510. In particular, while the music content 1510 is played, if the battery swap mode is entered, the mobile terminal 100 can output the play or stop icon to the display unit only.

FIG. 16 and FIG. 18 are diagrams to describe embodiments of running a content, which is currently run in a mobile terminal, in an external terminal in case of entering a battery swap mode. Yet, unlike FIGS. 12 to 15, in case that an external terminal is running the same content as run currently in a mobile terminal, FIG. 16 and FIG. 18 show embodiments of connecting the currently run contents.

In the following description with reference to FIG. 16 and FIG. 18, assume a case that the residual quantity of the backup battery remains enough to transmit a currently run content to an external terminal. Hence, according to the embodiment shown in FIG. 16 or FIG. 18, if the mobile terminal enters a battery swap mode, it is able to determine a content operating mode as a first content operating mode.

FIG. 16 is a diagram to describe one example of shooting a video in an external terminal in response to a content operating mode according to one embodiment of the present invention. In the following description of an embodiment with reference to FIG. 16, description redundant with the former description with reference to FIGS. 11 to 15 shall be omitted.

Referring to a first diagram of FIG. 16, a mobile terminal 100 can shoot a video content 1610 through a camera. In particular, the mobile terminal 100 can shoot the video content 1610 of a first view angle area including a first object through the camera. For instance, the mobile terminal 100 can record the first object during 3 minutes 10 seconds.

Referring to second and third diagrams of FIG. 16, if a residual quantity of at least one of a main battery and a backup battery becomes equal to or smaller than a preset value in the course of shooting the video content 1610, the mobile terminal 100 can output a popup window 1620 indicating a battery swap mode entry to a display unit. For instance, if a sensed residual quantity of the main battery becomes equal to or smaller than a preset value (e.g., 10%), since there remains 10% of the residual quantity of the main battery, the mobile terminal 100 can output the popup window 1620 indicating that a battery swap mode is entered.

According to one embodiment of the present invention, the mobile terminal 100 can detect an external terminal 1600 currently running the same content as run currently in the mobile terminal 100. In this case, the external terminal 1600 may correspond to a terminal currently shooting the video content 1610 currently run in the mobile terminal 100.

In particular, the mobile terminal 100 can receive a signal corresponding to a recording standby mode of the external terminal 1600 from the detected external terminal 1600. In this case, the recording standby mode may correspond to a state that a view angle are of a camera provided to the external terminal 1600 enters the first view angle area including the first object.

Namely, the mobile terminal 100 can detect whether the external terminal 1600 currently runs the same content and whether the external terminal 1600 has entered the recording standby mode for the same object in the same view angle area.

According to one embodiment of the present invention, the mobile terminal 100 can transmit a first control signal for controlling the external terminal 1600 to record the first object to the external terminal 1600. Hence, the external terminal 1600 can record the first object through the camera provided to the external terminal 1600. In doing so, the external terminal 1600 can output a popup window 1630 indicating that the video content 1610 recorded by the mobile terminal 100 continues to be recorded. Moreover, after the mobile terminal 100 has transmitted the control signal for controlling the external terminal 1600 to record the first objet to the external terminal 1600, if the mobile terminal 100 enters a battery swap mode, it is able to end the recording of the video content 1610.

Moreover, according to one embodiment of the present invention, the mobile terminal 100 can transmit a control signal for controlling the first object to be recorded by starting at a first timing to the external terminal 1600. In this case, the first timing may correspond to a timing for the camera of the mobile terminal 100 to end the recording of the video content 1610. Hence, the external terminal 1600 can record the first object by starting at the first timing. For example, if the mobile terminal 100 enters the battery swap mode in a state that the first object is recorded up to 3 minutes 10 seconds, the external terminal 1600 can record the first object by starting at 3 minutes 10 seconds. And, the external terminal 1600 can output a popup window 1630 indicating that the first object is recorded by starting at 3 minutes 10 seconds.

Referring to a fourth diagram of FIG. 16, the external terminal 1600 can transmit the recorded video data to the mobile terminal 100. The mobile terminal 100 ends the video content 1610 and is able to receive the recorded video data from the external terminal 1600 using the backup battery in the course of swapping the main battery. For instance, if the external terminal 1600 starts to record the first object from 3 minutes 10 seconds, it is able to transmit the video data recorded from 3 minutes 10 seconds to the mobile terminal 100. In this case, the external terminal 1600 can transmit the video data to the mobile terminal 100 as soon as the external terminal 1600 records the video content 1610.

Referring to a fifth diagram of FIG. 16, in case that the battery swap mode is ended, the mobile terminal 100 can record the ended video content 1610 again. In doing so, the mobile terminal 100 can record the first object by starting at a second timing based on the video data received from the external terminal 1600. In this case, the second timing may correspond to a timing at which a time taken for the external terminal 1600 to record the first object from the first timing expires. For instance, if the external terminal 1600 records the first object for 30 seconds from 3 minutes 10 seconds, it is able to transmit video data amounting to 30 seconds to the mobile terminal 100. Hence, the mobile terminal 100 can record the first object by starting at 3 minutes 40 seconds based on the received video data.

According to one embodiment of the present invention, if the battery swap mode is ended, the mobile terminal 100 can transmit a control signal for controlling the recorded data to be deleted to the external terminal 1600. Hence, the external terminal 1600 can delete the recorded video data.

According to one embodiment of the present invention, the mobile terminal 100 can output a popup window 1640 indicating that the mobile terminal 100 continues to record the video content 1610 currently recorded by the external terminal 1600. For instance, the mobile terminal 100 can output the popup window 1640 indicating that the first object is recorded by starting at 3 minutes 40 seconds.

FIG. 17 is a diagram to describe one example of outputting minimum information only in shooting a video in response to a content operating mode according to one embodiment of the present invention. In the following description of an embodiment with reference to FIG. 17, description redundant with the former description with reference to FIGS. 11 to 16 shall be omitted.

Referring to a first diagram of FIG. 17 (*a*), a mobile terminal 100 can shoot a video content 1610 through a camera.

Referring to a second diagram of FIG. 17 (*a*), if a residual quantity of at least one of a main battery and a backup battery becomes equal to or smaller than a preset value in the course of shooting the video content 1610, the mobile terminal 100 can output a popup window 1720 indicating a battery swap mode entry to a display unit.

Referring to a third diagram of FIG. 17 (*a*), if a battery swap mode is entered in the course of shooting the video content 1710, the mobile terminal can output minimum information for operating a currently run content to the display unit. In this case, the minimum information may include information for the shooting of the video content 1710. For instance, the minimum information may include a shot stop icon of the video content 1710, a focus region indicator and the like.

Namely, according to one embodiment of the present invention, while the main battery is swapped, the mobile terminal 100 can output only the minimum information for the shooting of the video content 1710 using the backup battery.

Referring to a first diagram of FIG. 17 (*b*), the mobile terminal 100 can shoot a video content 1710 through the camera. Unlike FIG. 17 (*a*), although a residual quantity of at least one of the main battery and the backup battery does not become equal to or smaller than the preset value, the mobile terminal 100 can enter a battery swap mode. Namely, although a residual quantity of at least one of the main battery and the backup battery does not become equal to or smaller than the preset value, a user can swap the main battery.

Referring to a second diagram of FIG. 17 (*b*), if a battery swap mode is entered in the course of shooting the video content 1710, the mobile terminal can output minimum information for operating a currently run content to the display unit. In this case, the minimum information may include a black and white mode of the video content 1710.

According to one embodiment of the present invention, while the main battery is swapped, the mobile terminal 100 can shoot the video content 1710 in black and white mode using the backup battery.

In particular, by displaying necessary information enough to check a screen composition for shooting a video only, the mobile terminal 100 can maintain the minimum battery consumption in the course of swapping a main battery.

FIG. 18 is a diagram to describe one example of recording an audio in an external terminal in response to a content operating mode according to one embodiment of the present invention. In the following description of an embodiment with reference to FIG. 18, description redundant with the former description with reference to FIGS. 11 to 17 shall be omitted.

Referring to a first diagram of FIG. 18, a mobile terminal 100 can record audio or voice through a microphone by launching an audio recording content 1810. In this case, the audio recording content 1810 may include a recording application for example. In particular, the mobile terminal 100 can record an audio of a first object through the microphone. For instance, the mobile terminal 100 can record the audio of the first object for 4 minutes 52 seconds.

According to one embodiment of the present invention, the mobile terminal 100 can detect an external terminal 1800 currently running the same content as run currently in the mobile terminal 100. In this case, the external terminal 1800 may correspond to a terminal currently running the audio recording content 1810 currently run in the mobile terminal 100.

In particular, the mobile terminal 100 can receive a signal corresponding to a recording standby mode of the external terminal 1800 from the detected external terminal 1800. In this case, the recording standby mode may correspond to a state that a microphone provided to the external terminal 1800 senses the audio of the first object. Namely, the mobile terminal 100 can detect whether the external terminal 1800 currently runs the same content and whether the external terminal 1800 has entered the recording standby mode for the audio of the same object.

Referring to a second diagram of FIG. 18, the mobile terminal 100 can transmit a control signal for controlling the external terminal 1800 to record the audio of the first object to the external terminal 1800. In doing so, the external terminal 1800 can output a popup window 1820 indicating that the audio of the first object recorded by the mobile terminal 100 continues to be recorded.

Unlike FIG. 16, if the external terminal 1800 senses an input signal 1830 of continuing the recording through the outputted popup window 1820, it is able to record the audio of the first object provided to the external terminal 1800.

After the mobile terminal 100 has transmitted the control signal for controlling the external terminal 1800 to record the audio of the first objet to the external terminal 1800, if the mobile terminal 100 enters a battery swap mode, it is able to end the recording of the audio content 1810. Moreover, in case of receiving a signal corresponding to the input signal 1830 indicating that the recording is continued from the external terminal 1800, the mobile terminal 100 can end the running of the audio recording content 1810.

Referring to a third diagram of FIG. 18, the mobile terminal 100 can transmit a control signal for controlling the audio of the first object to be recorded by starting at a first timing to the external terminal 1800. In this case, the first timing may correspond to a timing for the microphone of the mobile terminal 100 to end the audio recording of the first object through the audio recording content 1810. Hence, the external terminal 1800 can record the audio of the first object by starting at the first timing. For example, if the mobile terminal 100 enters the battery swap mode in a state that the audio of the first object is recorded up to 4 minutes 52 seconds, the external terminal 1800 can record the audio of the first object by starting at 4 minutes 52 seconds. And, the external terminal 1800 can output a popup window 1830 indicating that the audio of the first object is recorded by starting at 4 minutes 52 seconds.

According to one embodiment of the present invention, the external terminal 1800 can transmit the recorded audio data to the mobile terminal 100. The mobile terminal 100 ends the audio recording content 1810 and is able to receive the recorded audio data from the external terminal 1800 using the backup battery in the course of swapping the main battery. For instance, if the external terminal 1800 starts to record the audio of the first object from 4 minutes 52 seconds, it is able to transmit the audio data recorded from 3 minutes 10 seconds to the mobile terminal 100.

Referring to a fourth diagram of FIG. 18, in case that the battery swap mode is ended, the mobile terminal 100 can record the audio of the first object again through the ended audio recording content 1810. In doing so, the mobile terminal 100 can record the first object by starting at a second timing based on the audio data received from the external terminal 1800. In this case, the second timing may correspond to a timing at which a time taken for the external terminal 1800 to record the audio of the first object from the first timing expires. For instance, if the external terminal 1800 records the audio of the first object for 30 seconds from 4 minutes 52 seconds, it is able to transmit audio data amounting to 30 seconds to the mobile terminal 100. Hence, the mobile terminal 100 can record the audio of the first object by starting at 5 minutes 22 seconds based on the received audio data.

According to one embodiment of the present invention, if the battery swap mode is ended, the mobile terminal 100 can transmit a control signal for controlling the recorded audio data to be deleted to the external terminal 1800. Hence, the external terminal 1800 can delete the recorded audio data.

According to one embodiment of the present invention, the mobile terminal 100 can output a popup window 1840 indicating that the mobile terminal 100 continues to record the audio of the first object currently recorded by the external terminal 1800. For instance, the mobile terminal 100 can output the popup window 1840 indicating that the audio of the first object is recorded by starting at 5 minutes 22 seconds.

Moreover, unlike FIG. 16, in case of sensing an input signal 1850 indicating that the recording is continued through the outputted popup window 1840, the external terminal 1800 can restart the recording of the audio of the first object through the microphone provided to the mobile terminal 100.

FIG. 19 is a diagram to describe one example of outputting a minimum information only in recording an audio in response to a content operating mode according to one embodiment of the present invention. In the following description of an embodiment with reference to FIG. 19, description redundant with the former description with reference to FIGS. 11 to 18 shall be omitted.

Referring to a first diagram of FIG. 19, a mobile terminal can record audio of a first object through a microphone by launching an audio recording content 1910. While the audio of the first object is recorded, if a battery swap mode is entered, the mobile terminal 100 can sense a residual quantity of a backup battery. Based on the sensed residual quantity of the backup battery, the mobile terminal 100 can determine a content operating mode as a second content operating mode.

Referring to a second diagram of FIG. 19, if the content operating mode is determined as the second content operating mode, the mobile terminal 100 can output minimum information for operating the currently run content to a display unit. In this case, the minimum information may include information for the recording of the audio recording content 1910. For instance, the minimum information may include an icon for ending the recording of the audio recording content 1910.

According to one embodiment of the present invention, the mobile terminal 100 can output the icon for ending the recording of the audio recording content 1910 to the display only using the backup battery in the course of swapping the main battery.

While the audio recording content 1910 is run in a second content operating mode, if the mobile terminal 100 detects that the battery swap mode is ended, the mobile terminal 100 can run the audio recording content 1910 in a previous manner.

FIG. 20 is a diagram to describe one example of outputting a minimum information only in making a video call in response to a content operating mode according to one embodiment of the present invention. In the following description of an embodiment with reference to FIG. 20, description redundant with the former description with reference to FIGS. 11 to 19 shall be omitted.

Referring to a first diagram of FIG. 20, a mobile terminal 100 can launch a video call content 2010. The mobile terminal 100 can perform a video call with a counterpart terminal using the video call content 2010. While the video call content 2010 is run, if a battery swap mode is entered, the mobile terminal 100 can sense a residual quantity of a backup battery. Based on the sensed residual quantity of the backup battery, the mobile terminal 100 can determine a content operating mode as a second content operating mode.

Referring to a second diagram of FIG. 20, if the content operating mode is determined as the second content operating mode, the mobile terminal 100 can output minimum information for operating the video call content 2010. In this case, the minimum information for running the video call content 2010 may include a name of the counterpart terminal, a call time, and a call end icon. In particular, while the video call content 2010 is run, if a main battery is detached from the mobile terminal 100, the mobile terminal 100 ends an output of image data of the currently run video call content 2010 and is able to output the name of the counterpart terminal, the call time, and the call end icon only.

While the video call content 2010 is run in a second content operating mode, if the mobile terminal 100 detects that the battery swap mode is ended, the mobile terminal 100 can run the video call content 2010 in a previous manner.

FIG. 21 is a diagram to describe one example of changing a mode in the course of a voice call in response to a content operating mode according to one embodiment of the present invention. In the following description of an embodiment with reference to FIG. 21, description redundant with the former description with reference to FIGS. 11 to 20 shall be omitted.

Referring to a first diagram of FIG. 21, a mobile terminal 100 can launch a voice call content 2110. The mobile terminal 100 can perform a voice call with a counterpart terminal using the voice call content 2110. While the voice call content 2110 is run, if a battery swap mode is entered, the mobile terminal 100 can sense a residual quantity of a backup battery. Based on the sensed residual quantity of the backup battery, the mobile terminal 100 can determine a content operating mode as a second content operating mode.

Referring to a second diagram of FIG. 21, if the content operating mode is determined as the second content operating mode, the mobile terminal 100 switches the voice call content 2110 to a messenger content 2120 and is able to launch the messenger content 2120. In particular, while the video call content 2110 is run, if a main battery is detached from the mobile terminal 100, the mobile terminal 100 pauses the voice call content 2110 and is then able to transceive messages with a counterpart terminal by switching to the messenger content 2120.

While the messenger content 2120 is run in a second content operating mode, if the mobile terminal 100 detects that the battery swap mode is ended, the mobile terminal 100 ends the messenger content 2120 and can run the voice call content 2110 in a previous manner.

Thus, if the mobile terminal determines the content operating mode as the second content operating mode, the mobile terminal replaces a currently run content by another content having battery consumption less than that of the currently run content and is able to run the latter content until the battery swap mode is ended since an entry into the battery swap mode.

Figure 22:
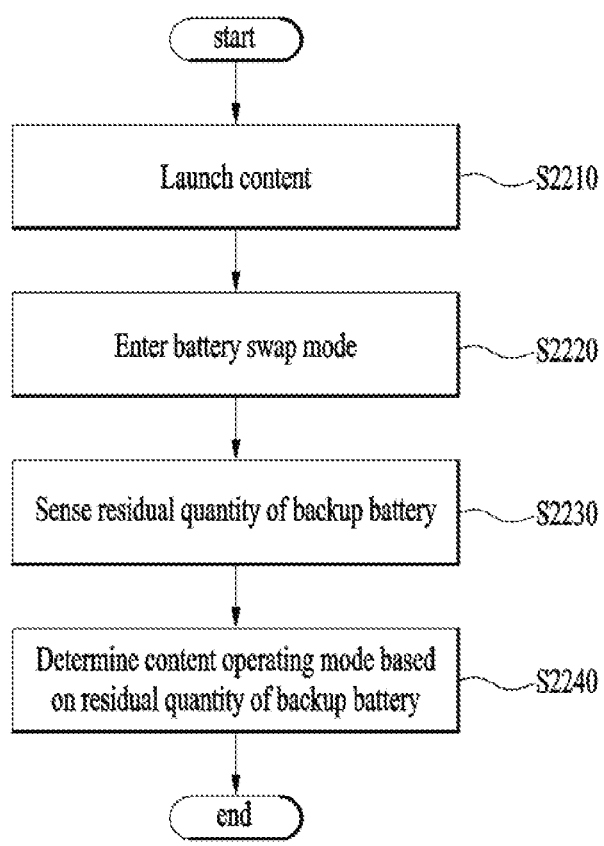
FIG. 22 is a flowchart to describe one example of determining a content operating mode based on a battery residual quantity according to one embodiment of the present invention.

FIG. 22 is a flowchart to describe one example of determining a content operating mode based on a battery residual quantity according to one embodiment of the present invention. The respective steps described with reference to FIG. 22 can be controlled by the controller shown in FIG. 1A.

In a step S2210, a mobile terminal can launch a content.

In a step S2220, while the content is run, the mobile terminal can detect that a battery swap mode is entered. In this case, the battery swap mode may correspond to a state that a main battery is detached or separated from the mobile terminal. For example, when a user detaches the main battery from the mobile terminal, the mobile terminal can detect that the battery swap mode is entered. For instance, in response to a long touch input signal of long pressing a power button by a user, the mobile terminal can detect that the battery swap mode is entered.

In a step S2230, the mobile terminal can sense a residual quantity of a backup battery.

In a step S2240, the mobile terminal can determine a content operating mode based on the sensed residual quantity of the backup battery. In this case, the content operating mode may include a first content operating mode for controlling a currently run content to be run in an external terminal, a second content operating mode for outputting a minimum information for running a currently run content, and a third content operating mode for maintain the running of a currently run content. And, the mobile terminal can set a different reference of a residual quantity of the backup battery to determine a content operating mode. In particular, the mobile terminal can determine the content operating mode in consideration of both a currently run content and a residual quantity of the backup battery.

Moreover, the mobile terminal can operate a content in response to the determined operating mode when the battery swap mode is entered.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

What is claimed is:
1. A mobile terminal, comprising:
a primary battery and a secondary battery;
a display; and
a controller configured to:
  detect a battery status of the secondary battery when the mobile terminal is changed to a battery swap mode while executing content; and
  select a content operating mode from a plurality of operating modes based on the detected battery status of the secondary battery;
  wherein the battery swap mode allows for the primary battery to be uncoupled from the mobile terminal.

2. The mobile terminal of claim 1, further comprising a wireless communication unit configured to communicate with an external terminal, wherein the controller is further configured to cause the wireless communication unit to transmit a first control signal for executing the content at the external terminal and terminate execution of the content at the mobile terminal when the selected content operating mode corresponds to a first content operating mode.

3. The mobile terminal of claim 2, wherein the controller is further configured to resume executing the content when the battery swap mode is terminated.

4. The mobile terminal of claim 3, wherein the controller is further configured to resume executing the content starting from at a first time point when the content execution was terminated in response to the first control signal.

5. The mobile terminal of claim 2, wherein the controller is further configured to determine whether the external terminal is executing the same content as the mobile terminal.

6. The mobile terminal of claim 5, further comprising a camera, wherein the controller is further configured to:
receive information via the wireless communication unit of a recording standby mode of the external terminal while recording a video via the camera of a first view angle which includes a first object;
detect whether a second view angle of a camera of the external terminal in the recording standby mode includes the first object;
cause the wireless communication unit to transmit a second control signal to the external terminal for starting recording of video of the first object at a first time point which corresponds to termination of recording video by the camera of the mobile terminal.

7. The mobile terminal of claim 6, wherein the controller is further configured to receive recorded video data ending at a second time point from the external terminal via the wireless communication unit.

8. The mobile terminal of claim 7, wherein the controller is further configured to resume recording video of the first object via the camera starting from the second time point when the recorded video data is received from the external terminal.

9. The mobile terminal of claim 8, wherein the controller is further configured to cause the wireless communication unit to transmit a third control signal for deleting the recorded video data at the external terminal when the battery swap mode is ended.

10. The mobile terminal of claim 5 further comprising a microphone, wherein the controller is further configured to:
receive information via the wireless communication unit of a recording standby mode of the external terminal while recording specific audio via the microphone;
detect whether a microphone of the external terminal is capturing the specific audio in the recording standby mode;
cause the wireless communication unit to transmit a second control signal to the external terminal for starting recording of the specific audio at a first time point which corresponds to termination of recording the specific audio by the microphone of the mobile terminal.

11. The mobile terminal of claim 10, wherein the controller is further configured to receive the recorded specific audio data ending at a second time point from the external terminal via the wireless communication unit.

12. The mobile terminal of claim 11, wherein the controller is further configured to resume recording the specific audio via the microphone starting from the second time point when the recorded specific audio data is received from the external terminal.

13. The mobile terminal of claim 12, wherein the controller is further configured to cause the wireless communication unit to transmit a third control signal for deleting the recorded specific audio data at the external terminal when the battery swap mode is ended.

14. The mobile terminal of claim 1, wherein the controller is further configured to cause the display to change a content display screen of the executed content to a minimal version of the content display screen when the selected content operating mode corresponds to a second content operating mode.

15. The mobile terminal of claim 1, wherein the controller is further configured to maintain execution of the content when the selected operating mode corresponds to a third content operating mode.

16. The mobile terminal of claim 1, wherein threshold levels of the battery status corresponding to selection of different content operating modes vary based on the type of content being executed at the mobile terminal.

17. The mobile terminal of claim 1, wherein the controller is further configured to cause the display to display an indicator indicating the mobile terminal being switched to the battery swap mode when a battery status of at least the primary battery or the secondary battery is less than or equal to a threshold level.

18. A method of controlling a mobile terminal, the method comprising:
executing content;
switching the mobile terminal to a battery swap mode while executing the content, wherein the battery swap mode allows for a primary battery of the mobile terminal to be uncoupled from the mobile terminal;
detecting a battery status of a secondary battery of the mobile terminal when the mobile terminal is switched to the battery swap mode;
selecting a content operating mode from a plurality of operating modes based on the detected battery status of the secondary batter;
sensing a residual quantity of a backup battery; and
determining a content operating mode based on the sensed residual quantity of the backup battery.

19. The method of claim 18 further comprising transmitting, to an external terminal, a first control signal for executing the content at the external terminal and terminating execution of the content at the mobile terminal when the selected content operating mode corresponds to a first content operating mode.

20. The method of claim 18 further comprising changing a content display screen of the executed content to a minimal version of the content display screen when the selected content operating mode corresponds to a second content operating mode.

* * * * *